(12) United States Patent
Bowron et al.

(10) Patent No.: US 9,458,619 B2
(45) Date of Patent: Oct. 4, 2016

(54) MODULAR BUILDING UNITS, AND METHODS OF CONSTRUCTING AND TRANSPORTING SAME

(71) Applicant: VectorBloc Corporation, Toronto (CA)

(72) Inventors: Julian Bowron, Toronto (CA); John Gulliford, New York, NY (US); Erik Churchill, New York, NY (US); John Cerone, New York, NY (US); Jonathan Mallie, New York, NY (US)

(73) Assignee: VECTORBLOC CORPORATION, Toronto, Ontario (CA)

( * ) Notice: Subject to any disclaimer, the term of this patent is extended or adjusted under 35 U.S.C. 154(b) by 0 days.

(21) Appl. No.: 14/770,012

(22) PCT Filed: Feb. 18, 2014

(86) PCT No.: PCT/CA2014/050110
§ 371 (c)(1),
(2) Date: Aug. 24, 2015

(87) PCT Pub. No.: WO2014/127472
PCT Pub. Date: Aug. 28, 2014

(65) Prior Publication Data
US 2016/0002909 A1    Jan. 7, 2016

Related U.S. Application Data

(60) Provisional application No. 61/768,328, filed on Feb. 22, 2013, provisional application No. 61/837,451, filed on Jun. 20, 2013, provisional application No. 61/935,992, filed on Feb. 5, 2014.

(51) Int. Cl.
*F16B 1/00* (2006.01)
*E04B 1/19* (2006.01)
(Continued)

(52) U.S. Cl.
CPC .............. *E04B 1/1903* (2013.01); *B66C 1/66* (2013.01); *E04B 1/24* (2013.01); *E04B 1/3483* (2013.01);
(Continued)

(58) Field of Classification Search
CPC .................. E04B 1/1903; E04B 1/40; E04B 2001/1978; E04B 2001/2451; E04B 2001/2403; E04B 2001/2406; E04B 2001/2472; E04B 2001/2418; F16B 7/0486; F16B 7/185; B66C 1/66; Y10T 403/342; Y10T 403/341; Y10T 403/347; Y10T 403/44; Y10T 403/4602; Y10T 403/73; Y10T 403/555; Y10T 403/42
USPC ....... 52/79.1, 79.2, 79.3, 79.9, 79.13, 125.2, 52/655.1, 655.2; 403/170, 171, 173, 174, 403/176, 202, 205

See application file for complete search history.

(56) References Cited

U.S. PATENT DOCUMENTS 4,726,701 A * 2/1988 Thomas ................ F16B 7/0446
403/172
5,127,759 A * 7/1992 Orbom .................. E04B 1/1903
403/171

(Continued)

FOREIGN PATENT DOCUMENTS

CN    202559534 U    11/2012
DE    249 688 A1    9/1987

(Continued)

OTHER PUBLICATIONS

PCT International Search Report for International Application No. PCT/CA2014/050110 dated May 5, 2014, 4 pages.

(Continued)

*Primary Examiner* — Brian Glessner
*Assistant Examiner* — Adam Barlow
(74) *Attorney, Agent, or Firm* — Fitch, Even, Tabin & Flannery, LLP

(57) ABSTRACT

A connector assembly, having an upper connector coupled to a lower connector and a gusset plate sandwiched between the upper and lower connectors. Also, disclosed is a hoistable connector assembly, a lifting frame assembly, a coupling system for modular frame units, a method for assembling a module unit using the connector assembly, and a modular frame unit and building having the connector assembly.

4 Claims, 43 Drawing Sheets

(51) Int. Cl.
*B66C 1/66* (2006.01)
*E04B 1/348* (2006.01)
*F16B 7/04* (2006.01)
*E04B 1/41* (2006.01)
*E04B 1/24* (2006.01)
*F16B 7/18* (2006.01)
*E04G 21/14* (2006.01)

(52) U.S. Cl.
CPC ............... *E04B 1/40* (2013.01); *F16B 7/0486* (2013.01); *E04B 2001/1978* (2013.01); *E04B 2001/2406* (2013.01); *E04B 2001/2418* (2013.01); *E04B 2001/2451* (2013.01); *E04B 2001/2472* (2013.01); *E04B 2001/2496* (2013.01); *E04B 2001/34892* (2013.01); *E04G 21/142* (2013.01); *F16B 7/185* (2013.01); *Y10T 403/42* (2015.01); *Y10T 403/555* (2015.01); *Y10T 403/75* (2015.01)

(56) References Cited

U.S. PATENT DOCUMENTS

| | | | |
|---|---|---|---|
| 5,414,918 A | 5/1995 | Pearson | |
| 5,820,289 A * | 10/1998 | Kern | H02B 1/01 211/182 |
| 5,904,437 A * | 5/1999 | Allen | A47B 47/0008 403/170 |
| 6,092,849 A | 7/2000 | Zambelli et al. | |
| 6,332,657 B1 * | 12/2001 | Fischer | A47B 47/0008 312/111 |
| 6,390,719 B1 * | 5/2002 | Chan | E04B 1/5806 403/205 |
| 7,883,288 B2 * | 2/2011 | Jorna | F16B 7/0453 403/171 |
| 2009/0307994 A1 | 12/2009 | Cathcart et al. | |
| 2013/0306808 A1 * | 11/2013 | Huang | A47B 13/06 248/163.1 |

FOREIGN PATENT DOCUMENTS

| | | |
|---|---|---|
| DE | 195 17 785 A1 | 11/1996 |
| DE | 697 04 916 T2 | 11/2001 |
| WO | 2006/096997 A1 | 9/2006 |
| WO | 2012/129601 A1 | 10/2012 |

OTHER PUBLICATIONS

Written Opinion issued by the Intellectual Property Office of Singapore for International Application No. PCT/CA2014/050110 dated May 2, 2016, 5 pages.

* cited by examiner

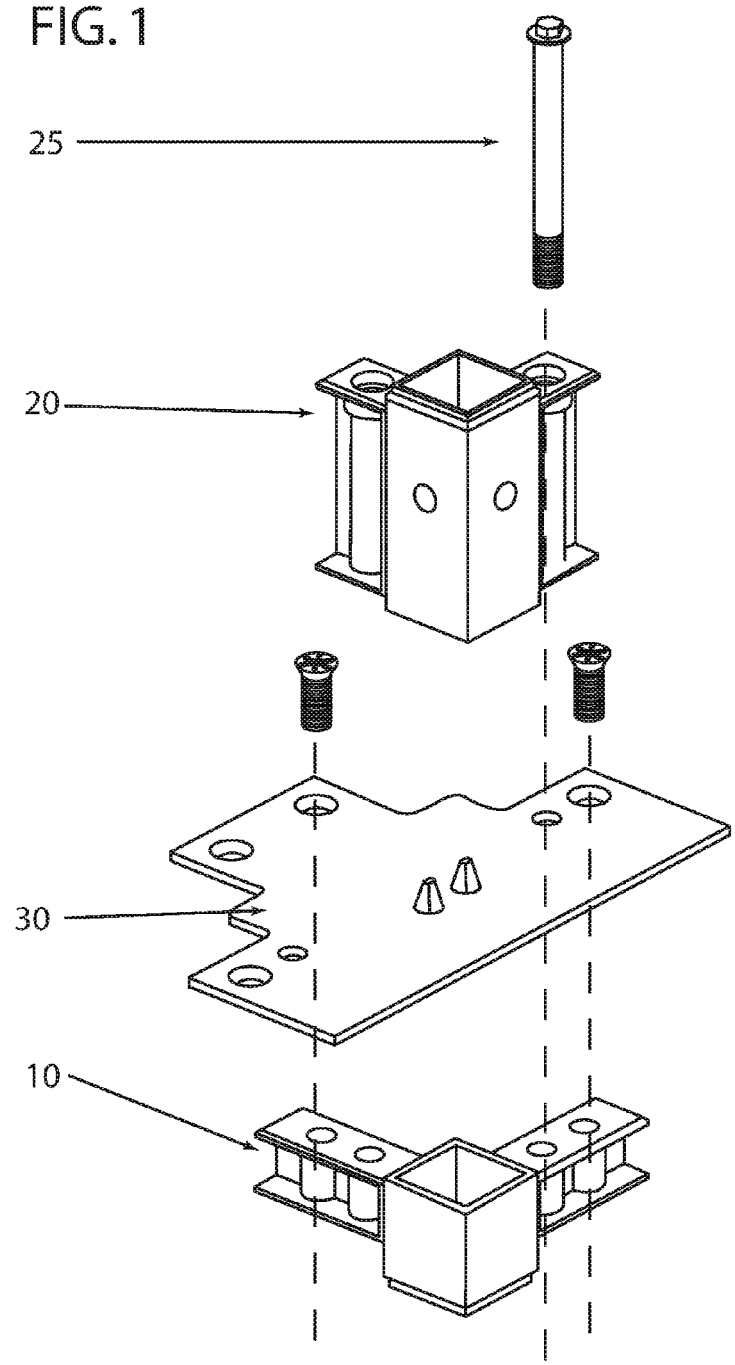

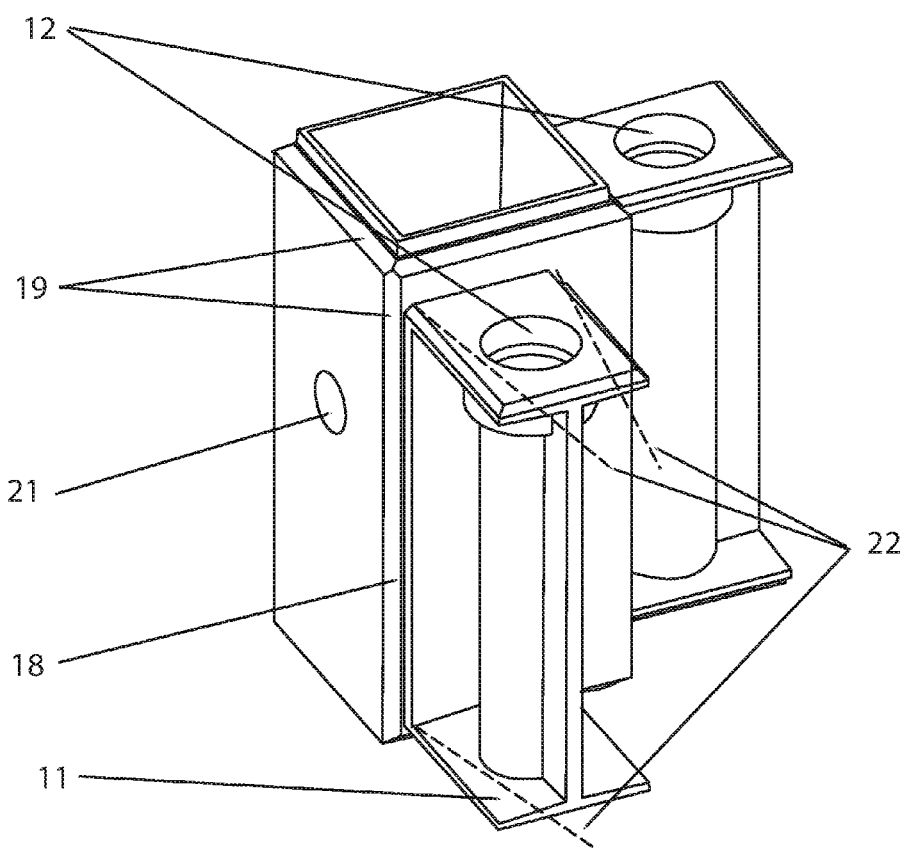
FIG. 1.1

FIG. 1.2
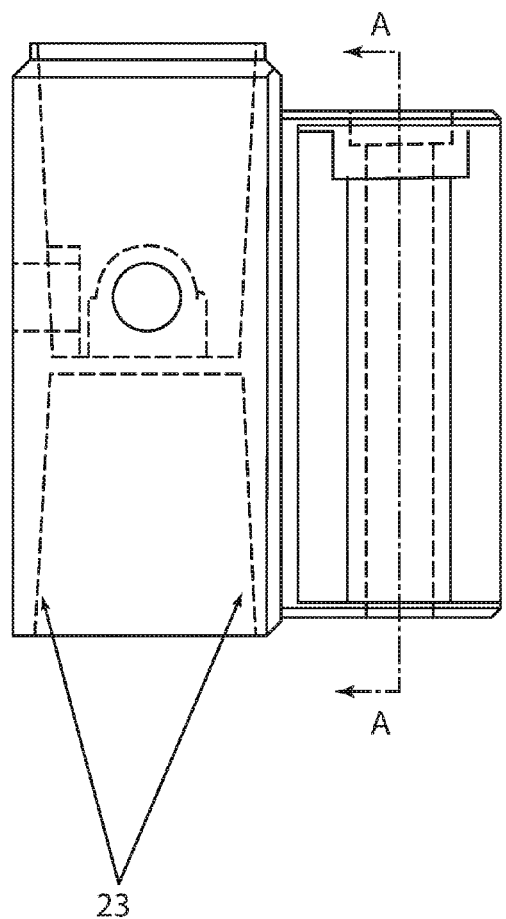

FIG. 1.3
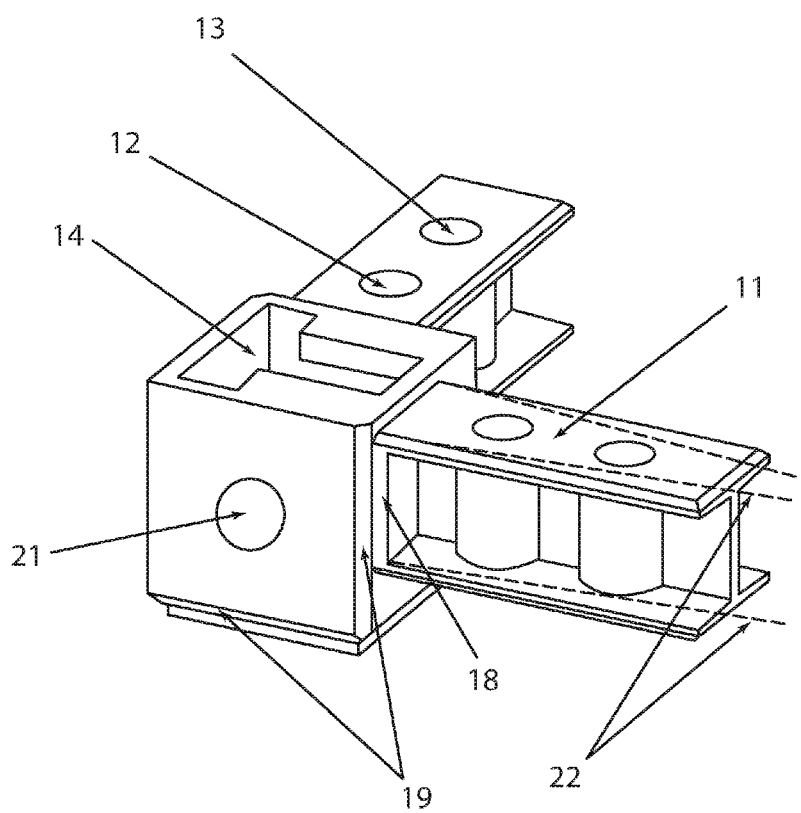

FIG. 2.1
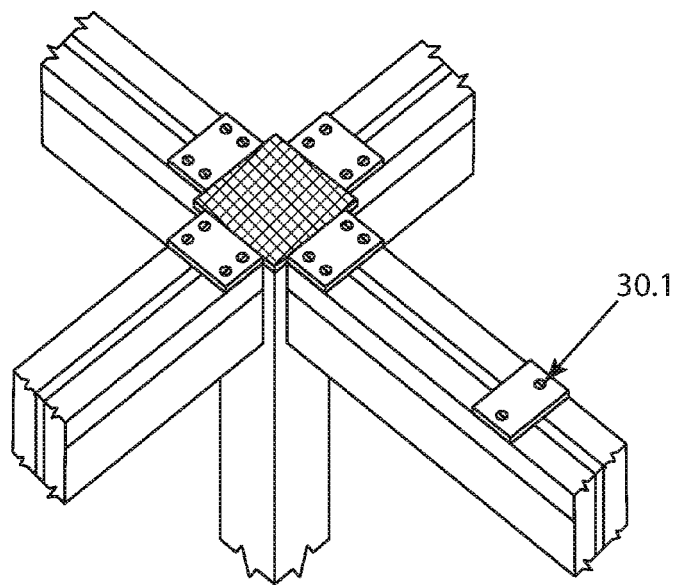
FIG. 2.2
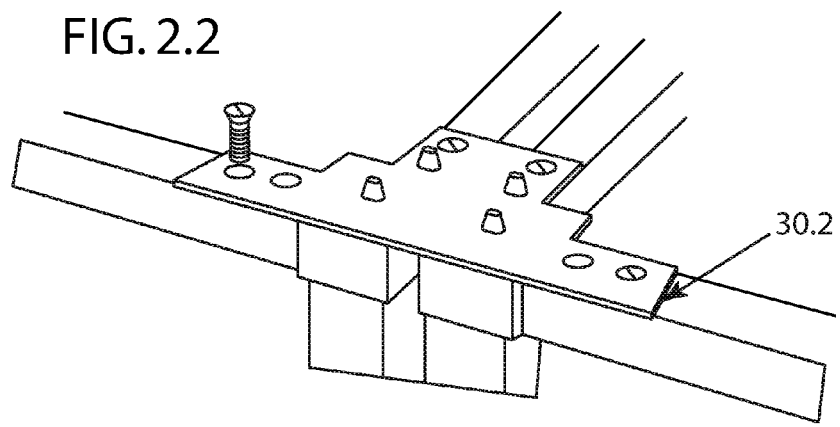

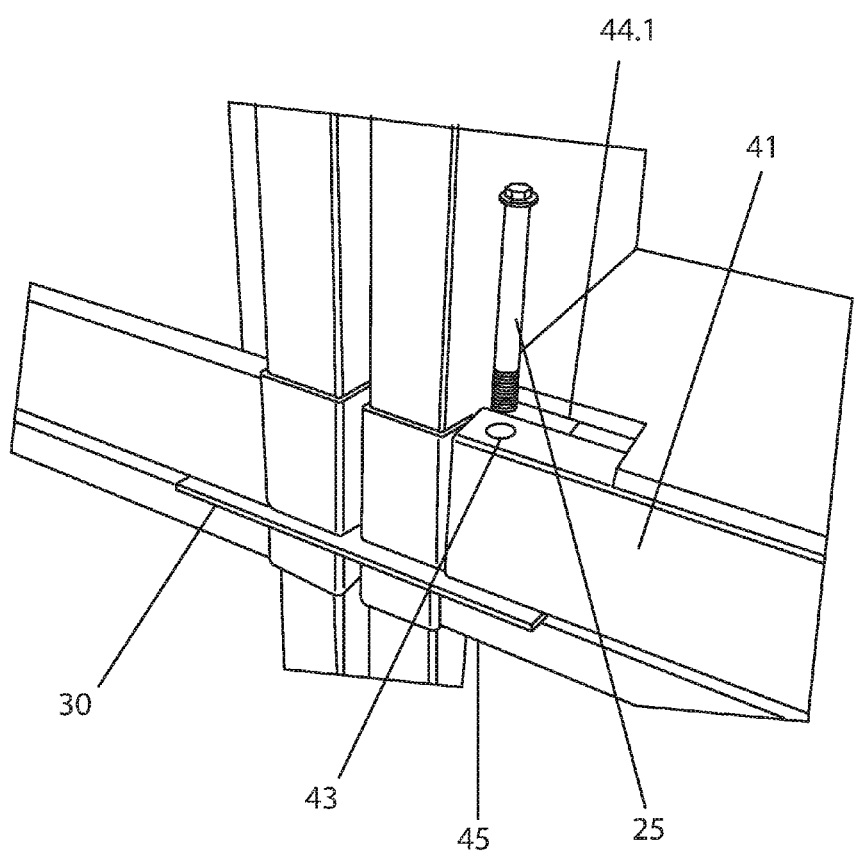
FIG. 3.1

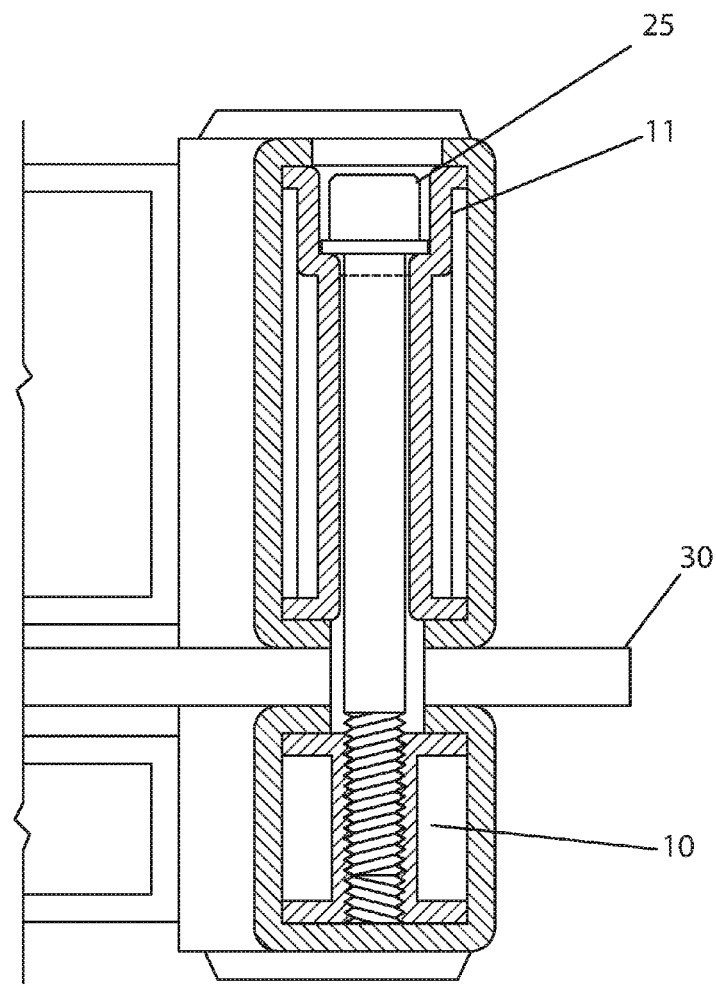
FIG. 3.2

FIG 3.3
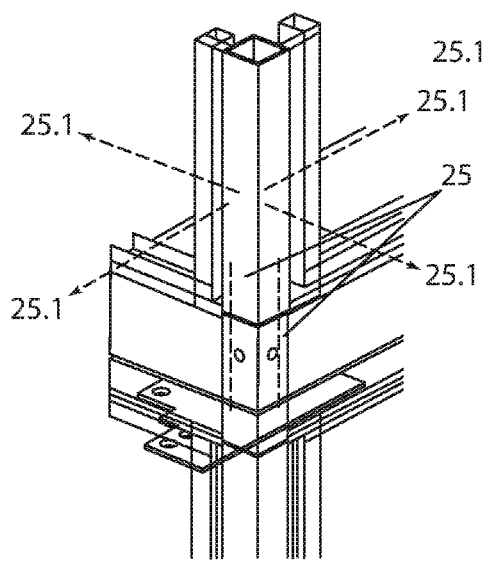
FIG. 3.5
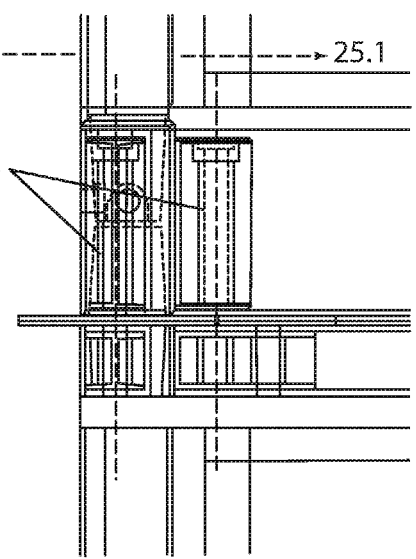

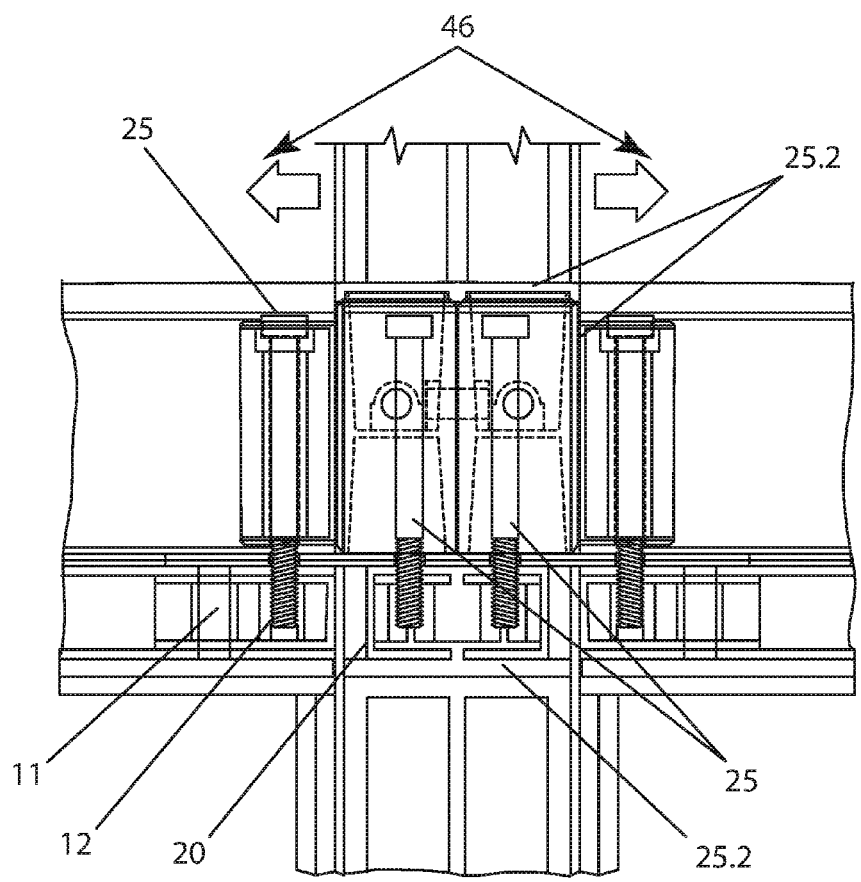

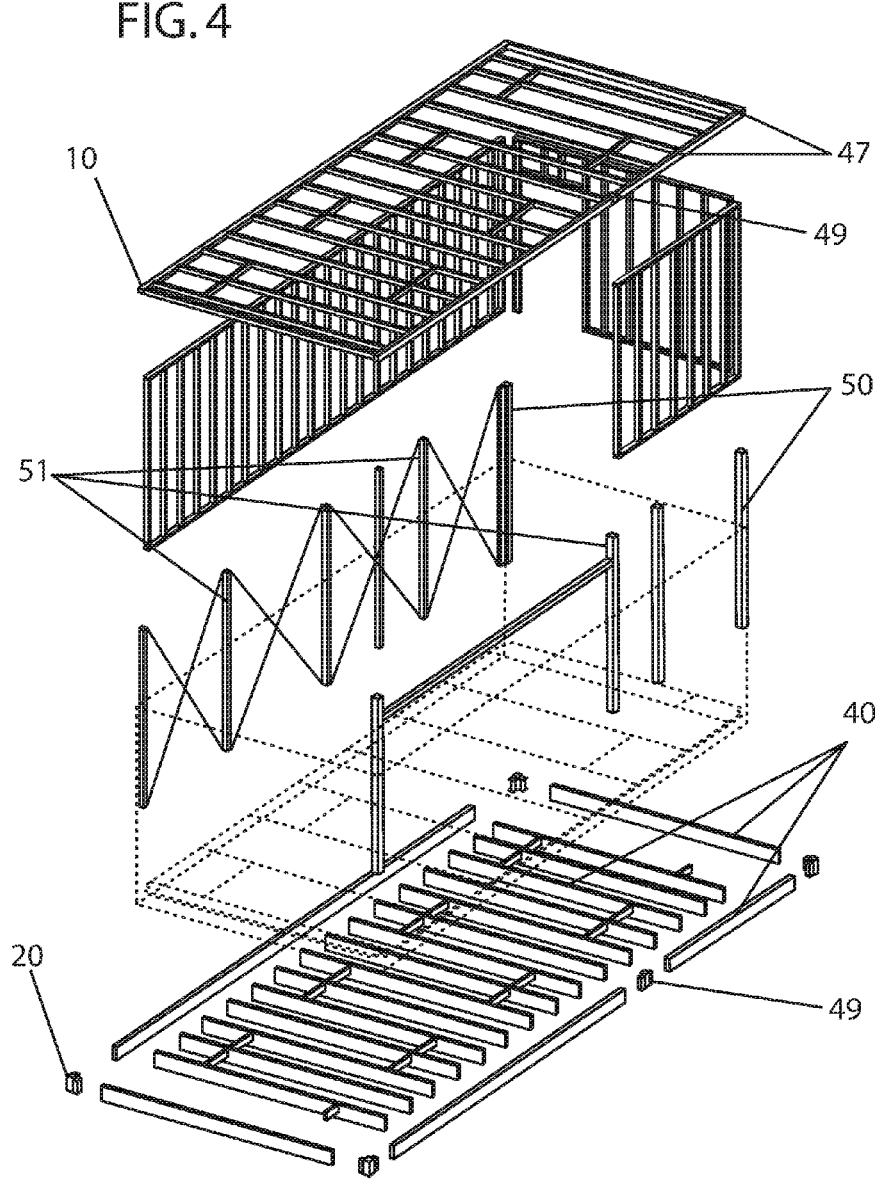

FIG. 4.1
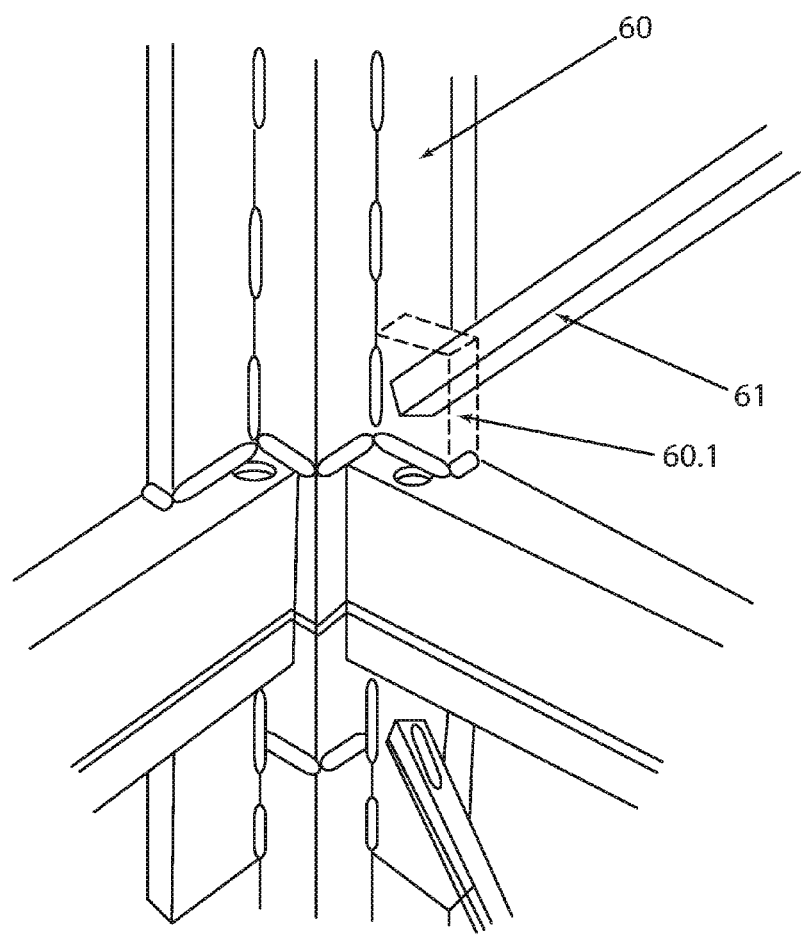

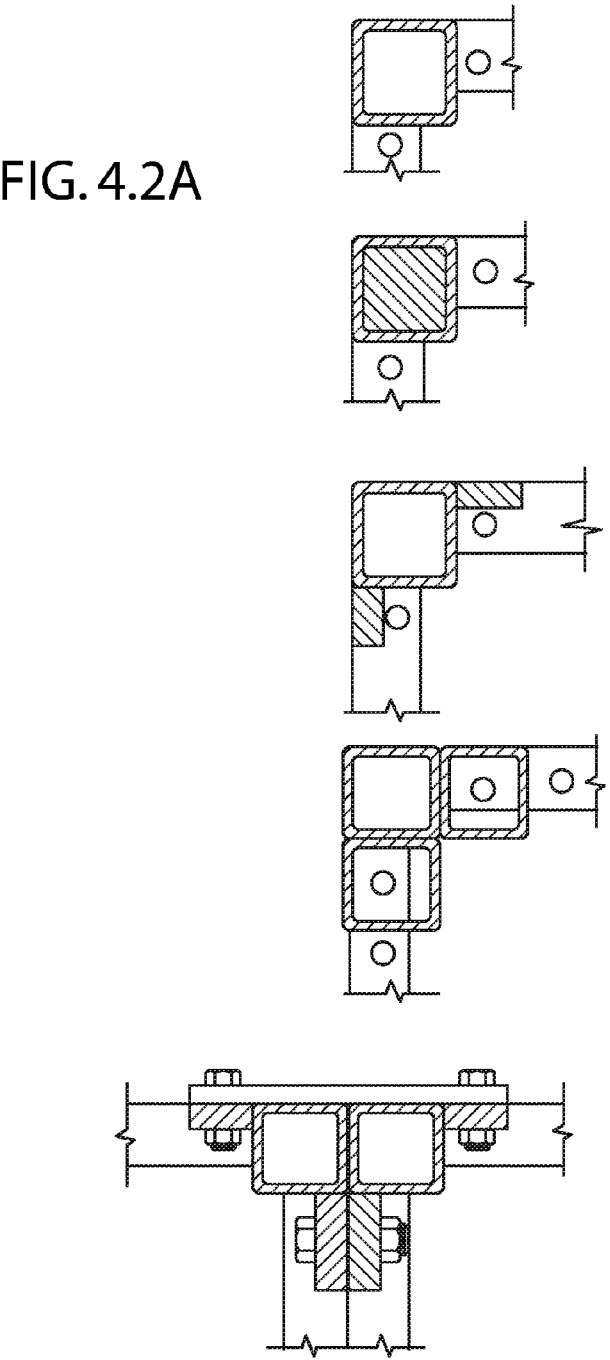
FIG. 4.2A

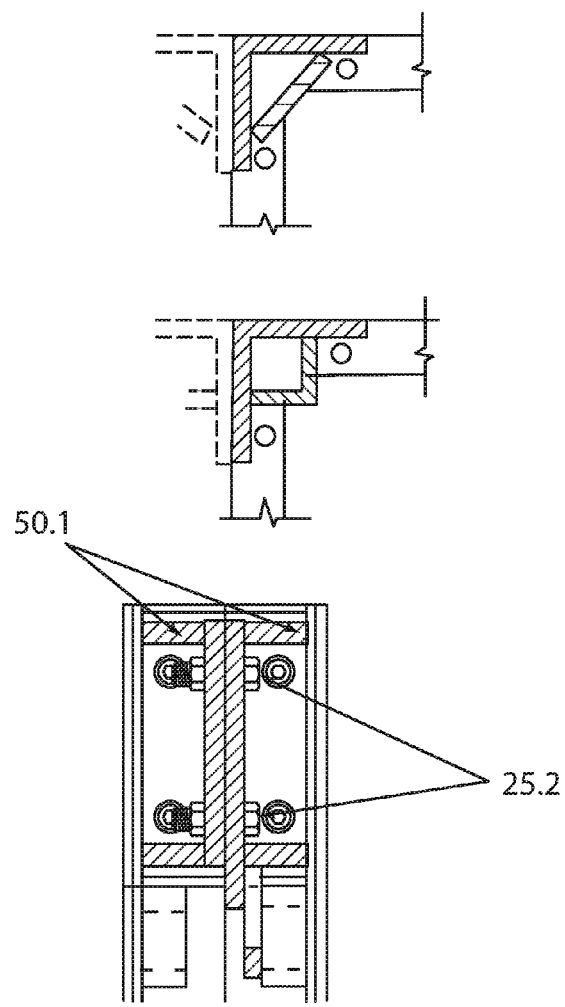
FIG. 4.2b

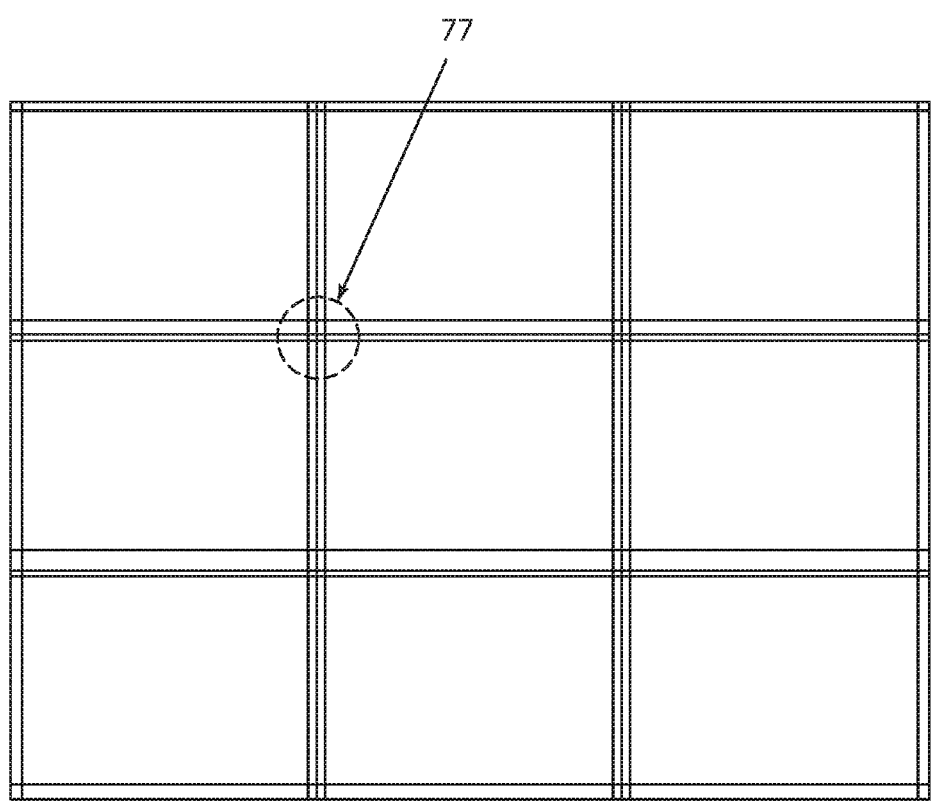
FIG.6.1

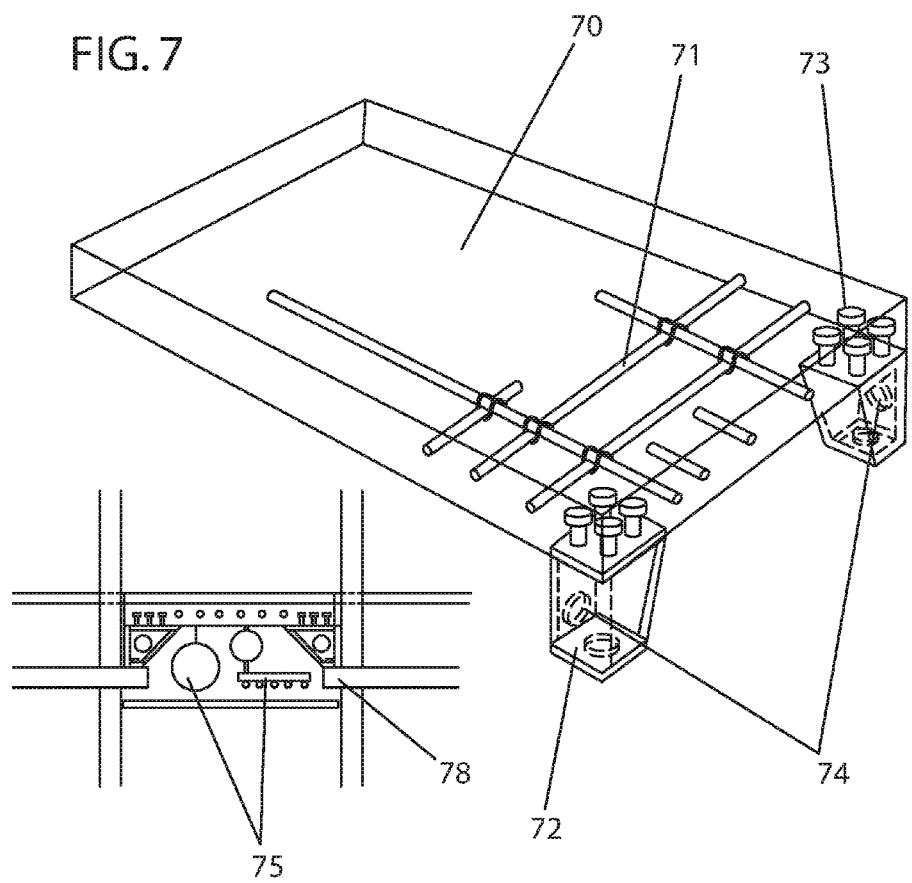

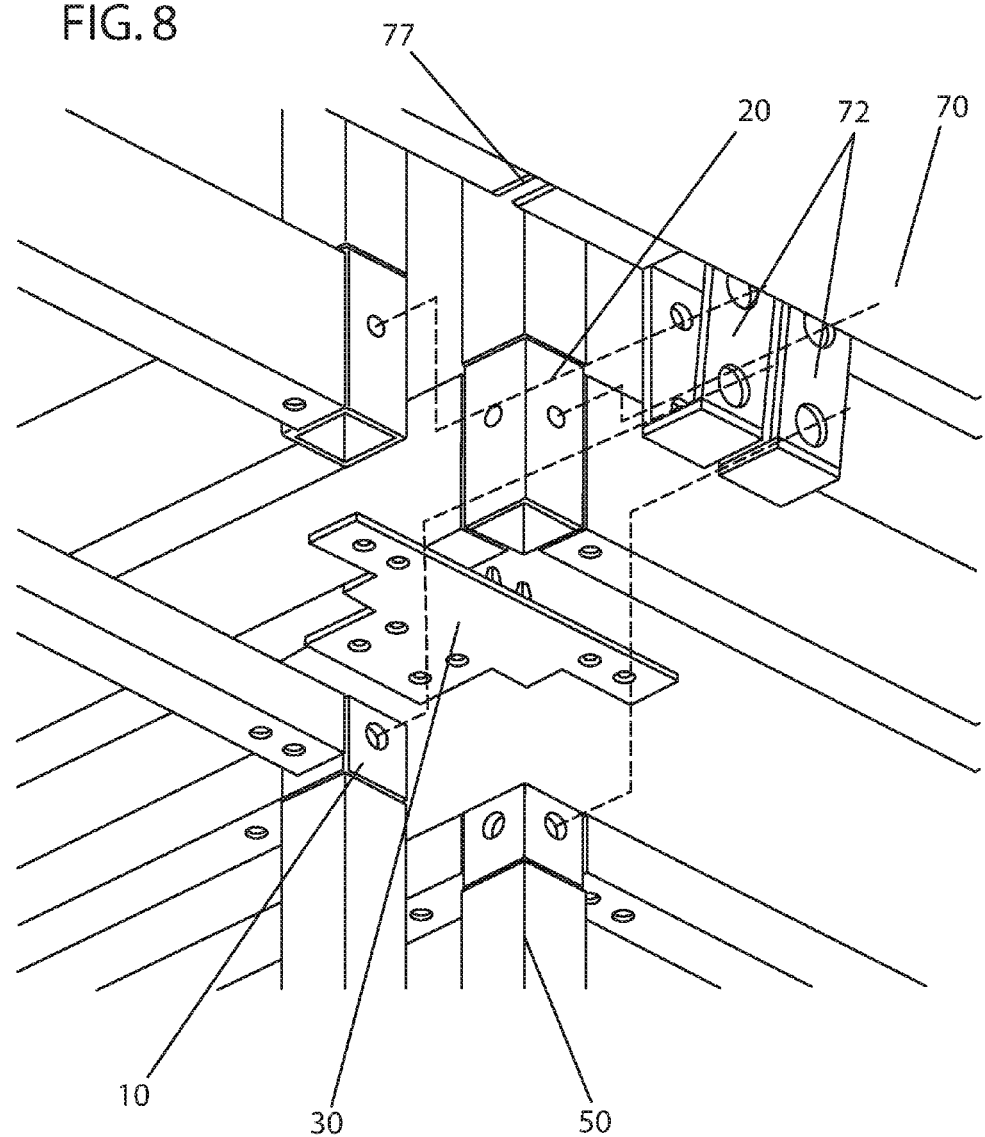

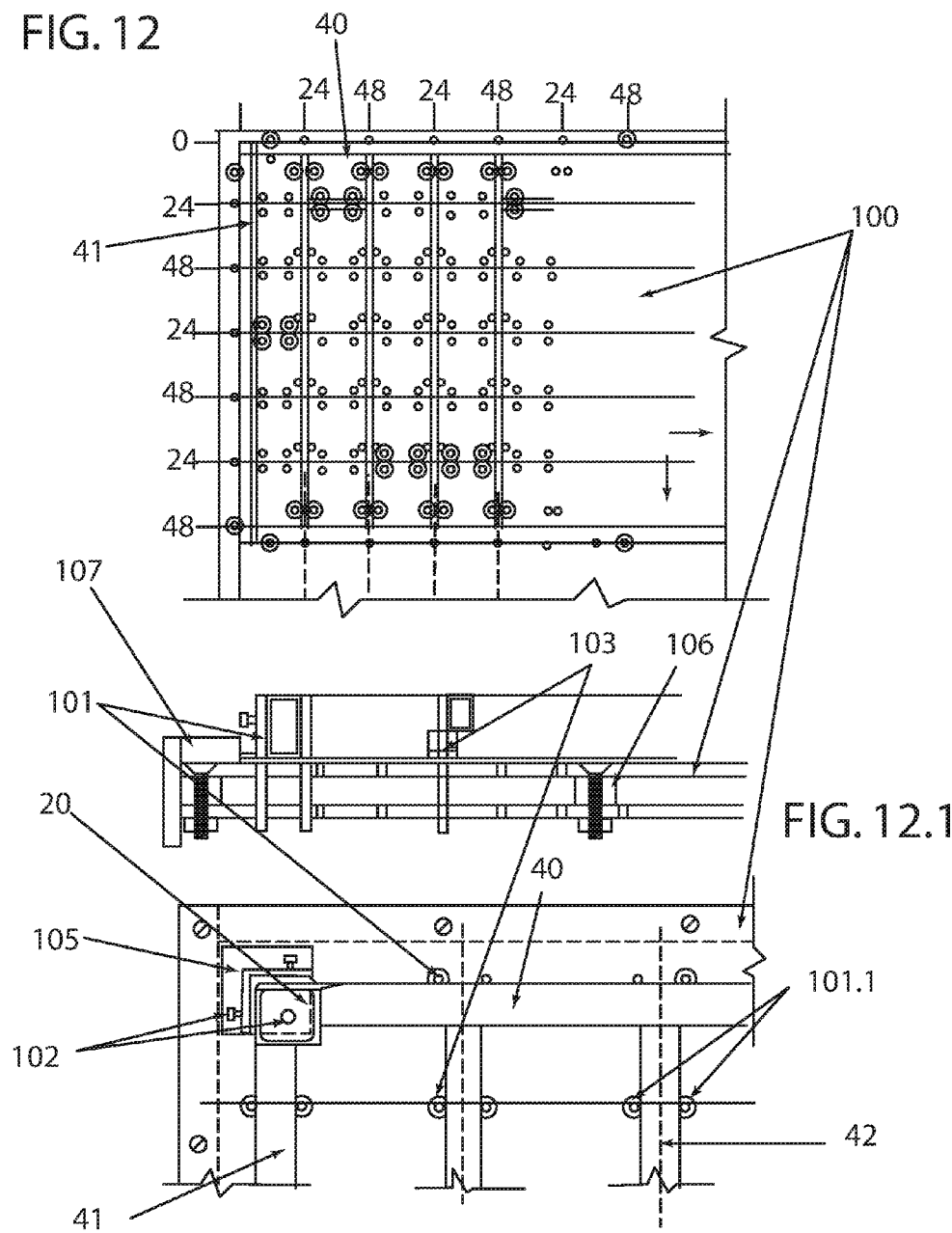

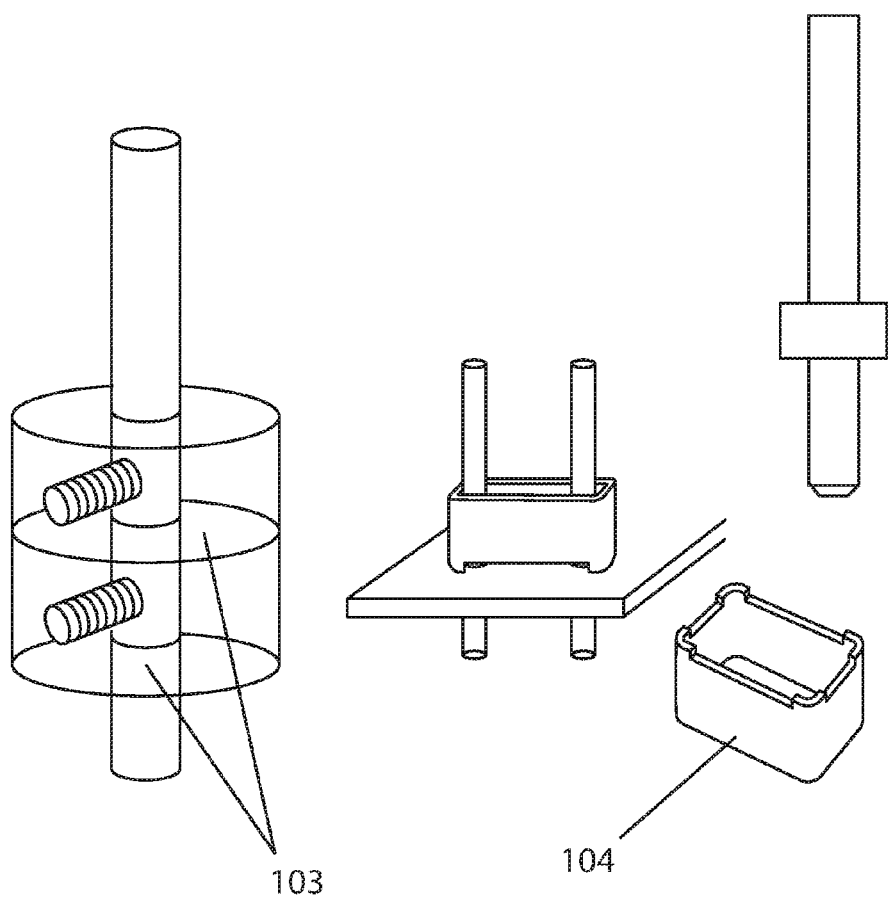
FIG. 12.2

FIG. 12.3
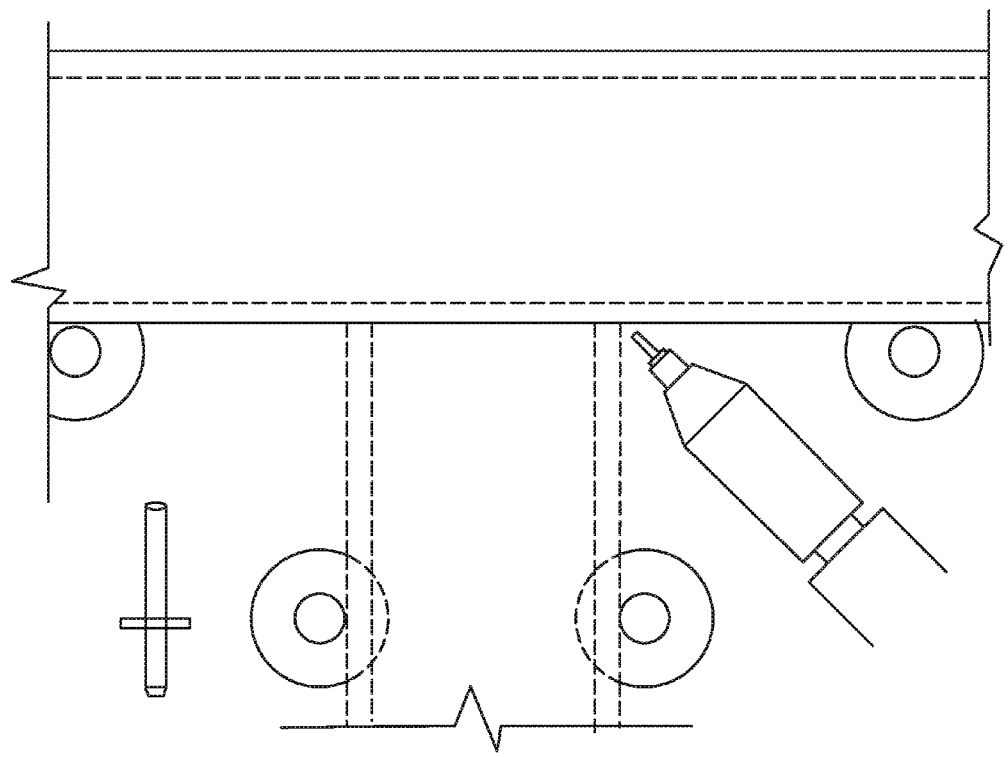

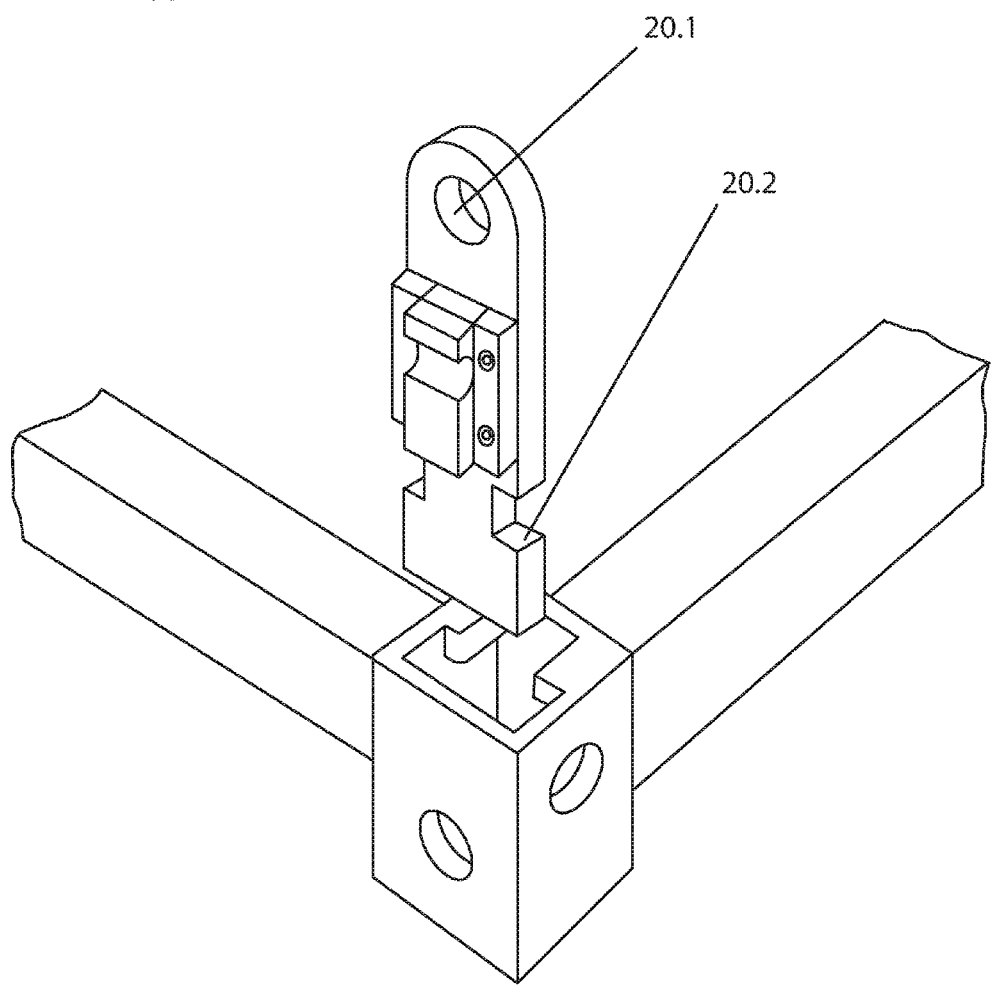

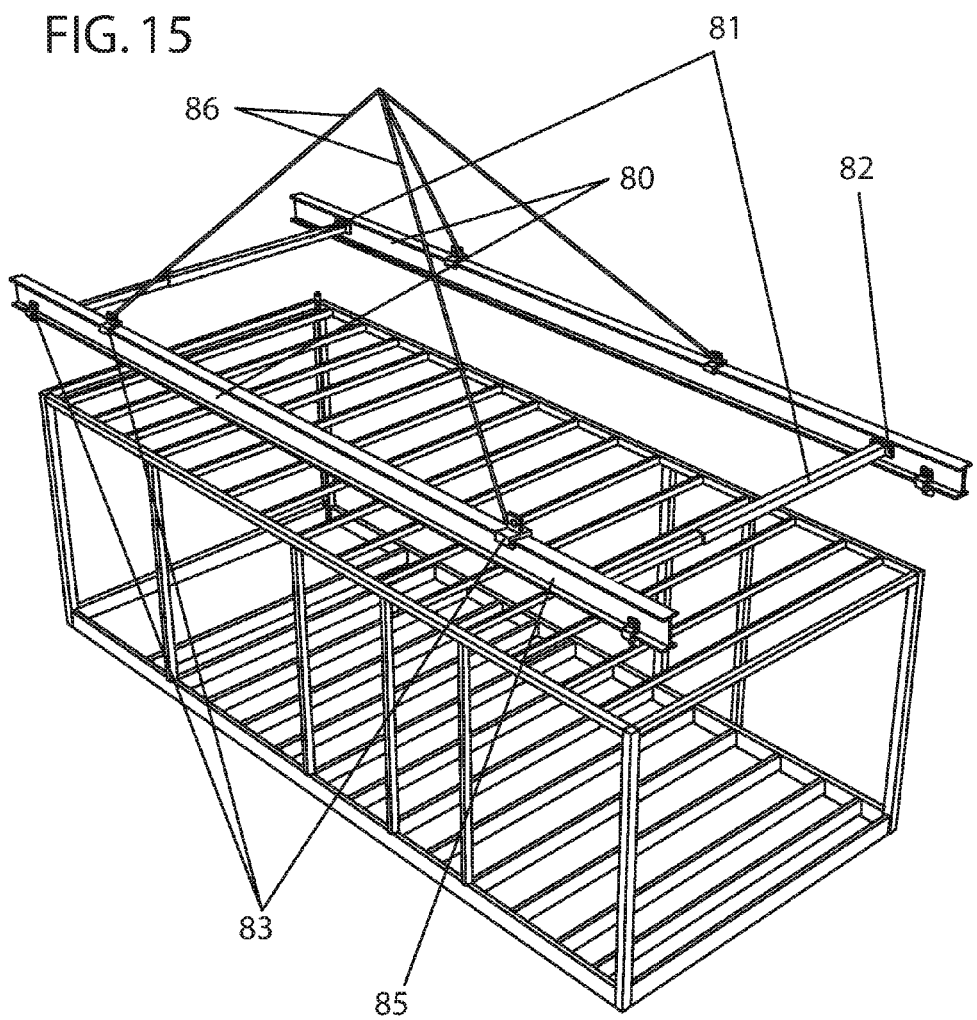

FIG. 15.1
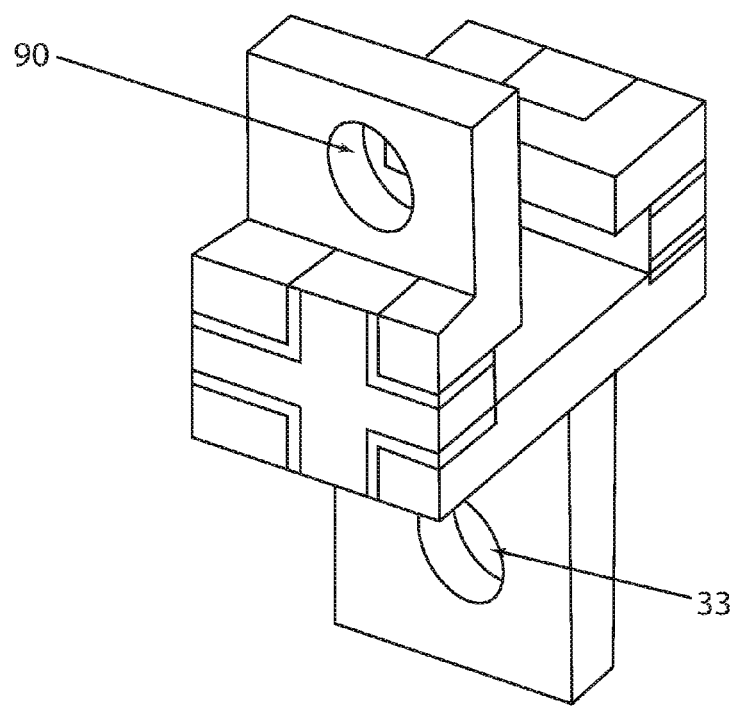

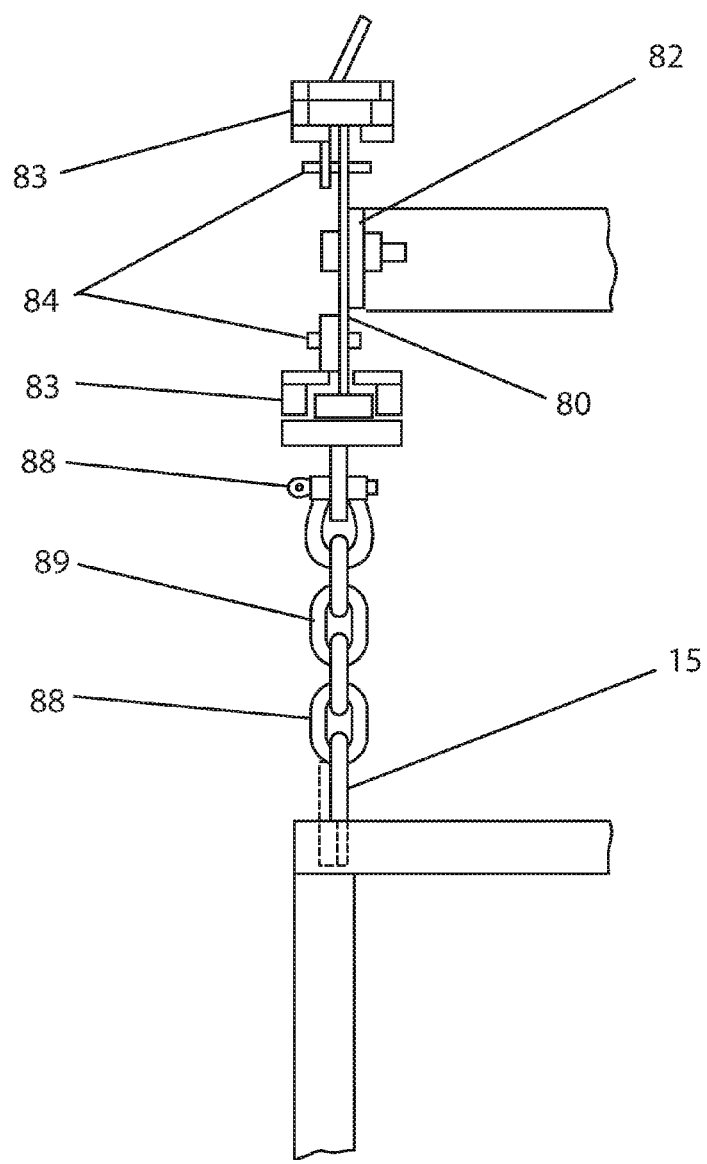

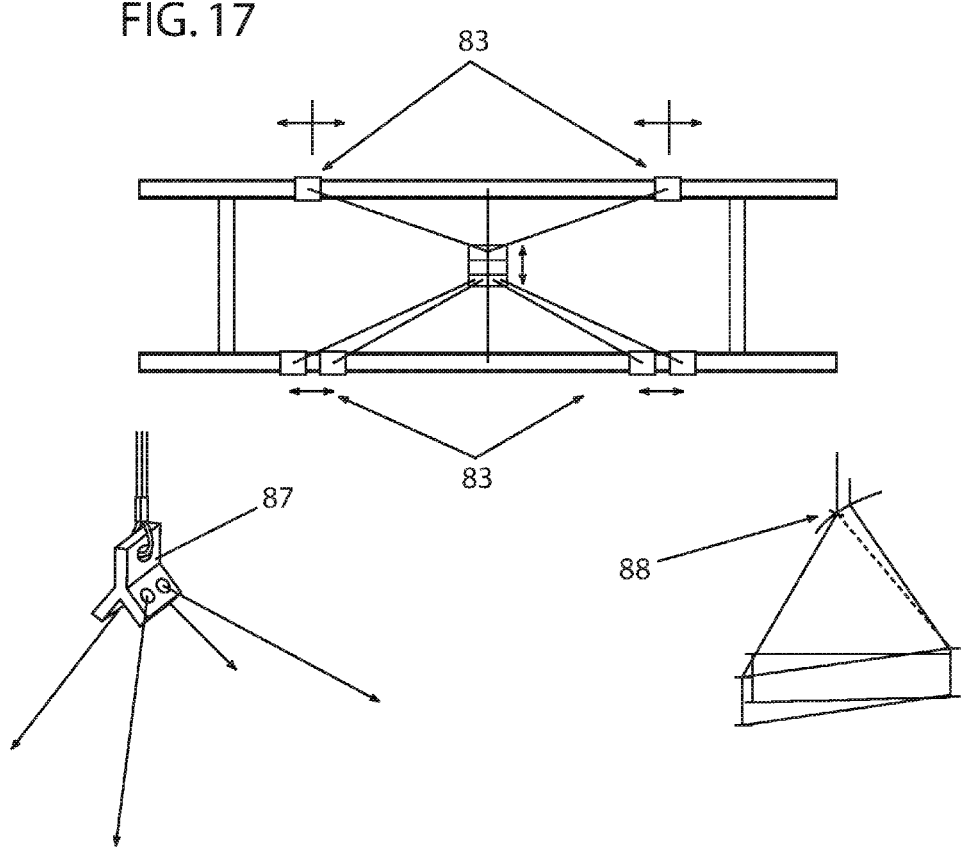

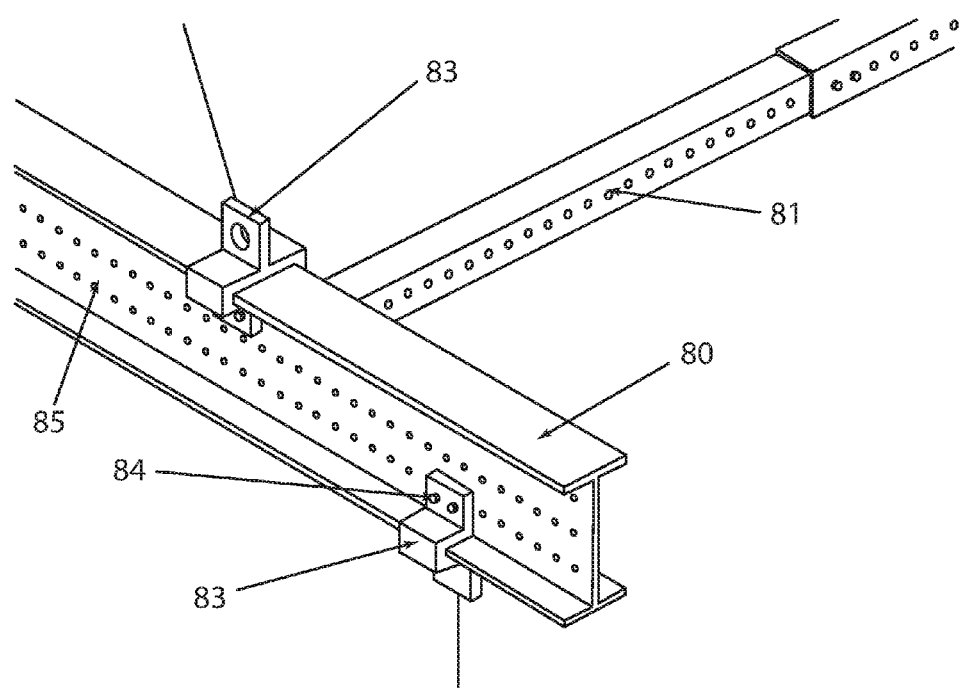
FIG. 17.1

MODULAR BUILDING UNITS, AND METHODS OF CONSTRUCTING AND TRANSPORTING SAME

CROSS-REFERENCE TO RELATED APPLICATIONS

This application is a U.S. national phase application filed under 35 U.S.C §371 of International Application PCT/CA2014/050110, filed Feb. 18, 2014, designating the United States, which claims the benefit of and priority to U.S. provisional applications 61/768,628 filed Feb. 22, 2013, 61/837,451 filed Jun. 20, 2013, and 61/935,992 filed Feb. 5, 2014, having the title MODULAR BUILDING UNITS, AND METHODS OF CONSTRUCTING AND TRANSPORTING SAME. The content of the above patent applications is hereby expressly incorporated herein by reference in into the detailed description thereof.

FIELD

The invention relates to a connector assembly, a hoistable connector assembly using the connector assembly, a lifting frame assembly, a coupling system for modular frame units, a jig for forming a modular frame unit having the connector assembly, a method for coupling modular frame units having the connector assembly, a method of assembling a modular unit having the connector assembly and a building having the connector assembly.

BACKGROUND

It is widely known that prefabricating modular building units constructed from standardized components in a controlled factory setting is desirable due to the lowered costs and the increased quality which is obtainable in comparison to performing similar work on an outdoor construction job site.

Thus prefabricated modular building units having a floor, walls and an overhead structure, and which contain all the systems and furnishings pre-installed within them are preferred and well known in the art. Building assembly systems composed of the means and methods to join two or more modular building units together to form a larger structure are also well known in the art.

Devices which engage a specially prepared aperture on the upper or side surface of the structural frame so as to provide a releasable connection for the purpose of lifting and moving the modular building units are well known in the art.

A limitation to the construction of slender or tall buildings using factory-built modules is the inability of economically constructed modules to resist and transmit the large moments resulting from wind and seismic forces and the large compression loads resulting from the effect of gravity on the building and occupants. Further, all of these force types are exaggerated by narrowness in one or both axes of the building. These effects are greatest in the lower floors and rise in proportion to increasing height and slenderness, so forces are also largest at the lower floors. It is a characteristic of many modular construction systems that the pinned nature of the connections between adjacent modules and the lack of diagonal bracing beyond that necessary for integrity in shipping limits the effectiveness of force transmission through a larger assembly of conventional module types.

The state of the art for constructing tall or slender building using modules as taught in the art cited herein is to maintain the economies of scale in production by either reinforcing the entirety of all modules of which the building is composed, so all contribute to resisting the forces in a distributed fashion as a stack of ocean freight containers do; or to employ large columns which are situated within or outside of the walls of all of the modules, creating an alternate load path; or to construct an adjoining or interconnected brace frame which by-passes the modules and transmits the large loads to the ground through the secondary structure; or to make use of a tension rod or cable which passes vertically through the building to anchor the modules against uplift and lateral drift. All of the above noted approaches can have limitations in the achievable resistance to forces and transmission of forces, or require the erection of an additional structure, which in turn can limit the achievable height or increases the amount of material used, therefore increasing the cost.

Additionally, methods of construction which employ large columns, particularly when grouped at corners or where occurring at intermediate locations within the walls result in larger spaces between modules, and/or walls of increased thickness which reduces the useful floor area of the resulting building, and/or projections which limit the free use of the voids and walls for the purposes of installing fixtures such as cabinets and shower stalls, and/or which imposes other limitations on the use of the space by the inhabitants, thereby decreasing the value of the resultant building.

Additionally, methods of modular building construction which employ secondary frames add to the assembly time for the building, increasing the cost and duration of construction and reducing the useful floor area, thereby decreasing the value of the resultant building.

Creating a multiplicity of dissimilar module types each having unique details relative to the forces acting on the module within a building is undesirable, as increased variation increases the number of unique components which must be measured, cut and inventoried until use. Additionally, setups of the manufacturing tooling required to accurately locate these parts relative to each other for assembly is error-prone and therefor normally executed by skilled persons, so any increase in the number of setups adds to both production time and cost.

Because the members comprising a networked structure must be of nearly identical length, creating the numerous features required to accurately assemble modules by welding or other means, the subsequent location and connection of the subassemblies of which a module is made, the rigging and hoisting of the completed modules and the fastening of the modules to form structurally sound groupings which provide redundant and adequate load paths as currently practiced, requires a number of precision cutting and assembly operations which increase cost.

It is well known in the art that a moment-connected module frame or building frame reduces the need for diagonal reinforcing elements which otherwise obstruct the view of the occupants and hinder the installation and maintenance of building services. However moment connections which require expansive splice plates as a means of connection require clear access to one or more faces of the module, thus increasing the amount of enclosing and finishing work which must be completed at the site.

Some embodiments of a modular building which best suit the site conditions, the needs of the occupants and the aesthetic tastes of the architect or owner may be composed of module forms having non-orthogonal shapes, including tapering, curving, polygonal etc. however existing systems for the construction of structural modules suited to tall building construction are by nature not suited to non-orthogonal shapes.

Varying shapes of modules and the varying location of walls, fixtures and other components causes the centre of gravity of modules used to construct a building or to furnish a single floor of said building, to vary. To facilitate placement while reducing the clearances to a minimum it is desirable to have the side walls of the modules oriented as closely to perpendicular as possible during hoisting. It has been the case that lengthy delays and repeated trial lifts are required to effect adjustments of the rigging so as to achieve this desirable condition. The time required to make the required changes in turn increases the total duration of the hoisting operation, thus increasing costs for both labour and equipment such as cranes as well as delaying the completion of the building.

The requirement to place and inter-connect modules which are not accurate increases the amount of space required between modules, which increases the difficulty of fireproofing the structure and the difficulty of interconnecting the members so as to achieve the greatest possible strength as well as making integration of modules in to structural groups more difficult and wasting space and providing space for the circulation of sound, smoke and vermin.

The dimensions of a module and the positional disposition of the members within it defines the position and size of the outer wall facings, of the mechanical services, of the abutting and adjoining modules and of the support structures beneath the building and a such there is an interdependent relationship between all the elements of which a modular building is composed.

The present invention can help to address the need for a compact, accurate, load-bearing, moment-connected, versatile and complete system of interrelated components for the orientation and assembly of module frames, which can facilitate quick and dependable rigging and hoisting of the completed modules and can provide for the connection of the modules to each other and to other necessary components of the building without the need for excessive unfinished areas so as to take full advantage of the structural properties of the modules and which defines and reduces the number of parts, provides features without the need for the fabrication of complex connections in the joining areas, excessive precision in the cutting of the required materials, the execution of difficult welds in difficult positions and a multiplicity of precision setups.

Specifically, the present invention consists of a system of components for the fabrication and assembly of building modules and to interconnect the modules to form buildings composed of those modules, together with a method for the definition of the number, selection and articulation of those components to be used in creating a modules suited to a specific configuration.

The present invention can also help to address the need for a system of components and work methods which allow a fabricator to economically and safely construct buildings of a wide range of types, from single family dwellings to towers of over 20 stories in a plurality of forms, including but not limited to orthogonal, tapering, radiating and curving shapes.

BRIEF DESCRIPTION OF THE DRAWINGS

Reference will now be made, by way of example, to the accompanying drawings which show example embodiments of the present application, and in which:

FIG. 1 is an exploded isometric view of a typical corner connection block;

FIG. 1.1 is a perspective view of a lower corner block;

FIG. 1.2 is a side view of a lower corner block showing the tapered locating coring;

FIG. 1.3 is a perspective view of an upper corner block;

FIG. 2.1 is a perspective view of a gusset plate joining 4 columns;

FIG. 2.2 is a perspective view of a gusset plate joining 2 columns;

FIG. 3.1 is a partial perspective view of the connection between two adjacent stacks of modules;

FIG. 3.2 is a vertical section through arms, gusset plate and HSS at a connection;

FIG. 3.3 is an isometric view of the connection between two modules in a single stack;

FIG. 3.4 is a partial front view of the connection between two adjacent stacks of modules;

FIG. 3.5 is a partial side view of the connection between two modules in a single stack;

FIG. 4 is an exploded isometric view of a module;

FIG. 4.1 is a partial isometric view of the inside of a module corner showing the vertical stiffeners and diagonal bracing;

FIG. 4.2 is a group of 3 top section views showing progressive alternate embodiments of a reinforced column;

FIG. 6.1 is a front view of a group of modules joined to form a building;

FIG. 7 is a transparent perspective view of a hallway slab and an end view of the slab installed in a building;

FIG. 8 is a partial exploded isometric view of the connection between two stacks of modules and the hallway floor at the point of connection between two consecutive hallway slabs;

FIG. 12 is a top view of the pin layout of the floor/ceiling layout and fabricating fixture;

FIG. 12.1 is a partial top view and a partial side view of the floor/ceiling layout and fabricating fixture;

FIG. 12.2 is a group of views showing the workpiece location pins (left) and two embodiments of the elevation blocks;

FIG. 12.3 is a partial top view of the location of the welds between typical members (centre) and a view of a single pin with clearances (bottom left);

FIG. 14 is an isometric view of the hoisting fitting and upper block;

FIG. 15 is an isometric view of the hoisting rig engaged to a module;

FIG. 15.1 is an isometric view of a typical sliding hoist point;

FIG. 16 is a partial end view of the hoisting frame shown engaged to a typical module;

FIG. 17 (upper) is a top view showing the effect on the lateral centre of gravity of moving the hoist points on the hoist frame (Bottom left) the combined hoisting point (bottom right) an end view of the shift in CG from centre to one side;

FIG. 17.1 is a partial perspective view of one corner of the hoisting frame;

Similar reference numerals may have been used in different figures to denote similar components.

DESCRIPTION OF EXAMPLE EMBODIMENTS

Figure 2:
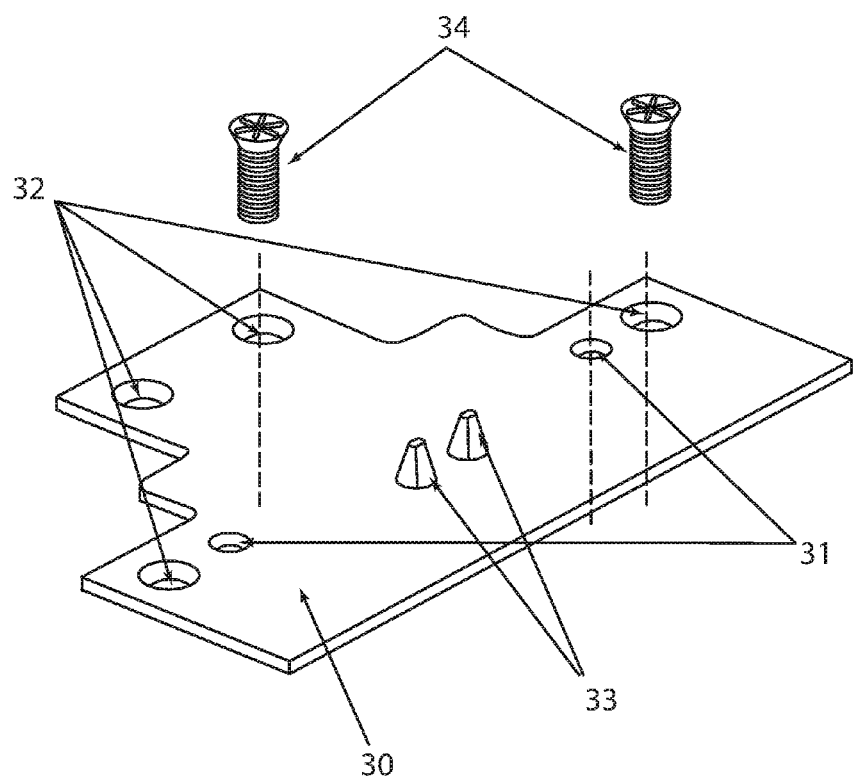
FIG. 2 is a perspective view of a gusset plate.

The specification has been subdivided in to a section for each component or group of components for convenience in reading.

Corner Blocks

The current invention provides upper and lower load-bearing connector or blocks which in one embodiment are corner blocks. In a particular embodiment, the blocks are substantially quadrilateral and in other embodiments have polygonal or asymmetrical shapes. These blocks can be mass-produced with features that provide a multiplicity of functions so as to concentrate the precision operations in a small number and size of objects and reduce the amount and complexity of work that must be performed on other members. The upper and lower blocks are of distinct forms and located on the upper and lower ends of the vertical corner members (columns) of generally angular, tubular or built-up form, which perform the function of multi-story columns when modules so constructed are joined using the features on the blocks to form a larger or taller structure.

Likewise other features on the blocks engage the horizontal members of the building and perform the function of continuous horizontal members when modules so constructed are joined to form a larger or wider structure.

In a particular embodiment, the blocks have tapering arms projecting at a plurality of angles including but not limited to perpendicular to the faces of the blocks providing for the location and welding of adjoining members at a plurality of angles. In a particular embodiment, the present invention thus facilitates the fabrication and erection of modules including but not limited to orthogonal, tapering, radiating and curving shapes. The threaded and unthreaded holes in the arms achieve the positioning of threaded fasteners and the vertical walls of the arms provide an increase in the load-bearing capacity and transmission of the compression and tension forces created by the forces acting on the building and by the action of the fasteners.

In a particular embodiment, the blocks have holes in both the body and the arms for the passage and receiving of bolts with nuts or are threaded to receive bolts, so as to provide continuity of vertical tension through the columns and a moment resisting interconnection between adjacent modules or other building structures. The tension resistance resulting from the connection of the columns in the vertical plane enables the structure to resist uplift where it occurs and produces friction on the gusset plate so as to convey forces to the lateral members in the horizontal plane with a high level of fixity.

More specifically, during assembly, the surfaces of the arms which are closest to the interior surface of the HSS which bears against the gusset plate is made tight, with all tolerance being on the opposite end, such that the tension imparted by the action of the bolt to the arms compresses the connecting surfaces and does not crush the HSS.

In a particular embodiment, the bolts are accessible within the wall cavity or other such places and can be arranged flush or below the surface such that a removable patch can be easily configured to cover the location of the bolt and ensure continuity of the fireproofing materials surrounding the load-bearing structures.

In a particular embodiment, the blocks have projecting features on the exterior and interior faces of the block located to provide backing for the assembly welding, reducing the structural impact of a weld to a connecting member that is cut to short or with an out-of square end or other imperfection reducing the probability of a worker executing a non-conforming welded connection between the corner blocks and the members which are welded to the block and a beveled feature so located on the outside of the block located so as to reduce the likelihood that a weld will project beyond the surface and conflict with an adjoining module.

The holes in the corner blocks provide a means of connection to tie-downs and hoisting devices. In a particular embodiment, the upper face of the block is prepared with an opening in to which a quick-release connector can be inserted so as to provide a means of quickly and dependably connecting and disconnecting the module to a lifting device.

Gusset Plate

Another component is a plate which is interposed between the blocks at the top and bottom ends of columns or groups of columns, which has upward-facing tapered locating pins for engaging and directing a descending module by sliding contact with a corresponding locating recess on the underside of a the corner block thus locating the module in the correct position for fastening. The plate also provides through holes for use in connecting adjacent modules with bolts to provide structural continuity in the horizontal plane both during construction and in the completed building and by virtue of its ductility, for accommodating slight variations in column length so as to ensure a continuous load path which bears equally on all members of the column group thus formed. As can be appreciated by someone knowledgeable in the art, the plate can be shaped to fit between a single vertical column or between two or more columns arranged in an orthogonal or other disposition. In a particular embodiment shims of a similar dimension and prepared with appropriate holes are placed in one or both sides of the connection to accommodate for variations in the finished dimensions of the modules thus maintaining the correct geometry of the modules stack.

Stairwells and Elevator Shafts

The system of the present invention allows for the fabrication of modules within which are installed stairs or elevating devices and which separate at the mateline between two modules without a significant visual or functional disruption.

Overheight Modules

The system of the present invention allows for the fabrication of modules which comprise the upper and lower halves of habitable volumes which are taller than shipping restrictions will normally allow and which are joined at the mateline between two or more stacked modules without a significant visual or functional disruption.

Hallways

Another group of components of the present invention is a structural hallway floor that is made from a suitable material such as reinforced concrete, sandwich plate, wood or formed metal together with supporting pedestals. In a particular embodiment, the slab is composed of reinforced concrete with reinforcement bars placed so that features on the support pedestals engage them so as to resist bending of the pedestals, thus creating a moment connection between stacks of adjacent modules thus connected. The pedestals are provided with holes that align with corresponding holes in the upper and lower corner blocks and serve to connect two parallel stacks of modules as well as connecting the adjacent columns within a stack on one side so as to create a combined load path. The pedestals and floor slabs may also be connected to the sides or ends of a stack of modules on one side of the slab and a balcony support frame on the outside to form a building with balconies or breezeways. The floor slab and pedestal assemblies can also be used as convenient carriers for building services such as ducts, pipes and wiring to facilitate the fabrication of these components off site in the factory environment.

System of Interdependent Detailing

The present invention also comprises a pre-determined grid upon which the dimensioning of the interconnected elements of subject building are based together with a system of fixtures which ensure the grid is maintained throughout all fabricated assemblies in all axes which ensures an accurate and interdependent relationship extending from corner blocks, to members, to subassemblies, to modules and to whole buildings in all axes. The dimensioning system thus serves to reduce fractional element and module sizing, to increase the number of common parts and to reduce the difficulty of coordination with foundation and podium contractors and which facilitates the work of all internal or external suppliers of components to be integrated in the modules so fabricated.

In a particular embodiment, the system is based on increments of no more or no less than two inches in three axes with a centre-to-centre accuracy between holes used for fastening of plus or minus 1/32" and an outside to outside dimensional accuracy of all mating surfaces of plus 0" minus 1/16".

Fixtures

The present invention includes a system for the assembly of the module frames which ensures that modules conform to the grid established above, and that no part of a module projects beyond the outermost ideal dimension, which increases the achievable speed of assembly and accuracy of the structure and, eliminates the possibility of additive dimensional drift, resulting in a reduction in the difficulty of erection, the difficulty of fireproofing, the possibility of interconnecting modules with a greater degree of fixity and a reduction in wall thickness and wasted space.

Table Fixture

A component of the system of the present invention is an adjustable fixture consisting of a flat table or a flat table mounted on trunions to allow pivoting, which is of sufficient thickness and prepared with a grid of holes to receive vertical pins so located as to orient the components of a module ceiling or floor frame for assembly welding, thus creating module subassemblies such as floors, ceilings and walls. The locating holes are laid out so as to ensure that modules conform to the grid established above, which is coordinated with other building elements to ensure that the modules thus produced are easily assembled in to form a complete module and the complete module can be assembled to form a building. The pins are equipped with a system of spacers used in ensuring the correct elevation of the components of the assembly so as to produce flush conditions as required for the application of floor or ceiling surfaces. The fixture is thus configured to ensure that welding is executed in a position ideal for the structural welding and so as to ensure that the completed parts do not exceed the tolerance envelope resulting in accumulating tolerance conditions.

Rotating Fixture

Another component of the present invention is an adjustable and rotatable fixture which orients a ceiling frame, a floor frame, the corner columns, the intermediate columns, the column reinforcements and the diagonal bracing, all of a plurality of dimensions; relative to each other for assembly welding so as to ensure that modules conform to the grid established above ensuring ease in the interconnection of modules and so as to ensure that the completed parts do not exceed the tolerance envelope and to ensure the parts can be oriented in a position ideal for the execution of the structural welds.

Quick Connect Hoisting Connector

Another component of the present invention is a releasable and compact quick-connector which is employed in the attachment of the hoisting apparatus to the module, which is installed in a specially prepared opening in the corner blocks, from above, without tools, which is resistant to being accidentally released and which can be removed without tools. In a particular embodiment, the connector is structurally ideal in that the upward-facing bearing surface of the toggle and the corresponding downward-facing bearing surface of the receiving block and the tension-loaded part of the toggle shaft which conveys the load from the bearing surface to the hoisting apparatus are in ideal proportion so as to maximize the load-bearing capacity of the combined elements within the most compact space and while maintaining the dimensional limits of the assembly within the top face of the corner block.

Hoisting Frame

Another component of the present invention is a hoisting apparatus which is arranged so as to suspend the load in an ideal posture for placement in the building, which in a particular embodiment is horizontal and which provides for the rapid adjustment of the position of all of the connection points from which lines pass to the crane hook so as to compensate for differences in the centre of gravity which occur in the length of a module. The device described also allows for altering the spread between pairs of cables on one side of the frame effecting a change in the dependant angle from vertical of the pair of lines which pass to the crane hook on one side of the module so as to move the centre of crane attachment to one side of the long axis of the frame so as to compensate for changes in the centre of gravity of loads which occur in the width of the module suspended from it.

Reinforcing Members

Further the invention comprise a system of standardized reinforcing members which connect with each other and with the columns, lateral framing, diagonal bracing and corner blocks described herein, eliminating the need for case-by-case design and fabrication or customization of reinforcement components.

Reinforcement Analysis

Further, the present invention comprises a work method for systematically analysing the forces acting on a building composed of modules, defining the optimum location for the application of the standardized reinforcing systems, selecting from a list of standardized reinforcements with progressive buckling and uplift resistance and thereby incorporating only such reinforcements as are minimally necessary to strengthen the areas under additional stress, without adding unnecessary structural material to more locations than required, without significantly disrupting the application of fireproofing materials and without requiring additional thickness of the walls of the module.

Built Up Columns

Further, the present invention comprises a method for the fabrication and connection of the outer columns so they form groupings with greater resistance to the compressive and tensile forces resulting from the loads encountered in the construction of tall and/or slender buildings.

Extendable Gasket

Further, the present invention comprises a gasket which extends to meet another opposed gasket after the module is placed by the action so as to prevent damage to the gasket surface during the hoisting and placement operation Benefits Increases Height without Frame The system of components and work methods of the present invention, by means of involving the whole of the modular building units thus created and connected, can serve to increase the height of a building which can be built without the requirement for a secondary external or internal bracing frame, and to increase its useable floor area due to involving a larger portion of the members in the structural function and the enhanced fixity of the connections, the creation and assurance of multiple and redundant load paths, the integration of the brace frame in to the module walls and the resulting efficient transfer of the external, internal and self-loads imposed on the completed building through the adjacent modules and thence to the ground.

Increases Height with Frame

By reducing the amount of steel required in upper floors and thus its total weight, this invention also serves to increases the height of a building which is built with the use of a secondary external or internal bracing frame of a given size.

Reduces Number of Unique Parts, Number of Locations and Size of Members

By analyzing the loads applied and more efficiently involving more of the required members in the structural function the invention also reduces the size of members required and limits the number, size and locations where unique reinforcement details and the related complexity of the fireproofing is required, thereby reducing the cost of such buildings.

Reduces Requirement for Precision

The present invention reduces the precision of the parts which must be made by workers in the modular production facility, which reduces the cost of the fabrication.

Reduces Complex Fabrication

The present invention concentrates many of the complex features required to join members, hoist modules and join modules in a single mass-produced component, reducing both the complexity and the requirement for skilled work necessary to construct a module.

Allows Taller and Wider

Additionally the system allows the building of taller modules composed of two stacked frames one of which has openings in the ceiling and the other of which has openings in the floor, longer modules due to the performance of the bracing and wider modules due to the improved behavior of the apertures in the ends, thus providing greater flexibility to designers of buildings so constructed.

Reduces Wall Thickness

By more perfectly distributing the load-bearing components the present invention reduces the wall thickness required to accommodate structure and services.

Reduces Site Labour for Patching

By placing the tension connections within the wall cavity and concentrating the connection means in the vicinity of the column, the present invention can reduce both the number and the extent of the leave-out areas which must be subsequently patched.

Eliminates Gasket Damage During Erection

By shipping and erecting the modules with the gasket in retracted position and then extending it post-erection, the present invention decreases the possibility of damage to the gasket and the attendant reduction in the performance of the building envelope.

The invention in accordance with an embodiment disclosed in the specification will now be described with reference to the accompanying drawings.

FIG. 1 Connector assembly 1 having Upper connector 10 and Lower connector 20 shown with gusset plate 30

FIG. 1 discloses an embodiment of a connector assembly 1 that is made up of an upper connector 10, a lower connector 20 and a gusset plate 30 sandwiched between the upper connector 10 and lower connector 20. The terms "upper" and "lower" are relative and can be interchanged. However, for the purpose of describing the connector assembly 1, upper connector 10 refers to connector that would typically be positioned at an upper corner or upper end of a modular frame that can be lifted and positioned on a second (or lower) modular frame. While lower connectors 20 refer to connectors positioned on the lower corner or lower end of a modular frame, and that would be closer to ground or floor (than the upper connector).

In the embodiment shown, the upper corner connector 10 and lower corner connector 20 can be made from hollow castings of steel. In addition, the upper connector 10 has an opening at one end (first end 2) that is formed for receiving a column, post or other structural unit of a modular frame, so that the upper connector can be coupled to an end of the of the first modular frame. While the second end 3 of the upper connector 10 is designed to allow coupling of the upper connector 10 to the gusset plate 30. The lower connector 20 can also be provided with an opening on both the first end 4 and the second end 5; with the first end 4 adapted for coupling to the gusset plate 30, while the second end 5 allows coupling to an end or corner of the second modular frame. The connectors can have mechanical properties such as tensile strength and ductility equal to or greater than mild steel and metallurgical properties such that the connector can be welded to mild steel with standard practices such as structural metal inert gas (MIG) welding.

In a further embodiment, the upper and lower connectors (10, 20) each have a hollow body (2, 4), respectively. The upper connector hollow body 2 and the lower connector hollow body 4 can have a variety of shapes depending upon the design and application requirements. However, in the figures, the upper and lower connectors (10, 20) have a hollow body (2, 4) that has a shape having a square cross-section. Provided on the outer surface of the hollow body 2 of the upper connector 10 are bosses 6. Similar bosses 18 are also provided on the outer surface of the hollow body (4) of the lower connector 20.

The upper connector 10 is provided by at least a pair of arms 11 that extend from the bosses 18. The lower connector 20 is also provided with at least a pair of arms 11 that extend from the bosses 18. In the embodiment shown, the arms 11 extend normally from the surface of the bosses 18. In addition, the arms 11 are positioned to be perpendicular to each other, i.e., one arm extends at nearly 90° to the second arm. However, the position of the arms 11 can be varied depending upon the design and application requirements, and the arms 11 can be present at angles less than or greater than 90°. The arms 11 on the upper connector 10 can be provided with apertures 12 that can be used for coupling of the upper or lower connector to the connector assembly 1.

In one embodiment, the central hollow bodies (2, 4) are 4" square to accept a 4"×4" Hollow Structural Section (HSS). In another embodiment, the central hollow bodies (2, 4) are 6" square to accept a 6"×6" HSS. Connectors 10 and 20 have adequate thickness for the intended function and details such as draft angles and uniformity of sections which facilitate casting. In a particular embodiment, the casting are drilled and surfaces milled to an accuracy of +0−0.010 inches as measured between centres of the apertures 12 and the locating surfaces of the arms 11, or other tolerances as may be convenient. In another embodiment, the connector is made by assembling one or more of rolled sections, flat or brake-formed plate by welding or mechanical means. In a further embodiment, the part is made by casting non-ferrous, plastic, cementitious or any other suitable material. In another embodiment, the portions of the blocks to which the columns and arms will be connected can have features to locate the HSS and facilitate welding.

The connector assembly 1 can be formed by sandwiching the gusset plate 30 between the upper connector 10 and lower connector 20. The gusset plate 30 shown has two faces, where the first face can be in contact with lower connector 20 and the second face can be contact with the upper connector 10. In addition, the gusset plate 30 is provided with through holes 31, which align with apertures 12 on the upper connector 10 and lower connector 20, allowing fastening of the connectors (10, 20) using fastening means. The fastening means is not particularly limited, and can include nut and bolts, screws.

FIG. 1.1 Lower Connector 20

The lower corner connector has bosses 18 which provide location to the longitudinal and transverse members of the module frame and backing for the assembly welds. In the embodiment shown, the edges of the hollow body of the upper and lower connectors have beveled edges. Bevels 19 provide a location for the exterior surface of the weld bead which allows the weld to lie flush and eliminates the need to bevel the connected member. The outer faces of lower connector 20 can have a plurality of holes (or bores) 21 which are threaded or unthreaded as required by circumstances for use in the connection of column groups, hallway slabs, fixtures, hoisting means or other useful features through the use of bolts, pins, clips, joining plates or other fastening means. In another embodiment, the connector 20 is taller and additional holes are provided for the use of additional fasteners or the addition of additional bracing or other features. In another embodiment, the connector 20 is more or less than 4-sided and not quadrilateral, but rather has trapezoidal, parallelogram or other shapes so as to facilitate the production of round, curving, tapering, star-shaped or other building forms.

The lower connector 20 has arms 11 with holes (or apertures) 12 for the passage of tension bolts 25 which pass through gusset plate 30 to secure the module vertically and provide a continuous tension and moment connection which passes loads through the connection between the stacked columns and the horizontal beams. In a further embodiment, these arms project perpendicular to the surface, in another embodiment they have tapered sides 22 so as to permit the connection of members at an angle and in another embodiment the whole of the arms projects at an angle.

FIG. 1.2 Lower Connector 20

In one embodiment, the connector 20 has dimensions as shown in FIG. 1.2. As described by the hidden lines the bottom face has an opening the sides of which are perpendicular or tapered in relation to the bottom face 23. A plurality of these openings on a module having a radial relationship to the module centre receive corresponding tapering locating pin 33 in the gusset plates 30 below, thus locating the module on top of the module below and in the correct position for connection.

FIG. 1.3 Upper Connector 10

The upper corner connector 10 has bosses 18 which provide location to the longitudinal and transverse members of the module frame and backing for the assembly welds. Similar to the lower connector 20, in the embodiment shown, the edges of the hollow body of the upper and lower connectors have beveled edges. Bevels 19 provide a location for the exterior weld bead which allows the weld to lie flush and eliminates the need to bevel the connected member. The outer faces of block 10 have a plurality of holes (or bores) 21 which are threaded or unthreaded as required by circumstances for use in the connection of column groups, hallway slabs, or other useful features through the use of bolts, pins, clips, joining plates or other fastening means. In another embodiment the block is taller and additional holes are provided for the use of additional fasteners or the addition of additional bracing or other features. In another embodiment the block is more or less than 4-sided and not quadrilateral, but rather has trapezoidal, parallelogram or other shapes so as to facilitate the production of round, curving, tapering, star-shaped or other building forms. In a further embodiment these arms project perpendicular to the surface, in another embodiment they have tapered sides 22 so as to permit the connection of members at an angle and in another embodiment the whole of the arms projects at an angle.

In another further embodiment, the upper connector 10 has arms 11 with threaded holes (or second aperture) 12 closest to the body of the block for the receipt of tension bolts 25 and threaded holes (or first aperture) 13 most distant from the block for the receipt of gusset plate screws 34. In a particular embodiment these arms project perpendicular to the surface, in another embodiment they have tapered sides 22 so as to permit the connection of members at an angle and in another embodiment the whole of the arms projects at an angle.

Figure 13:
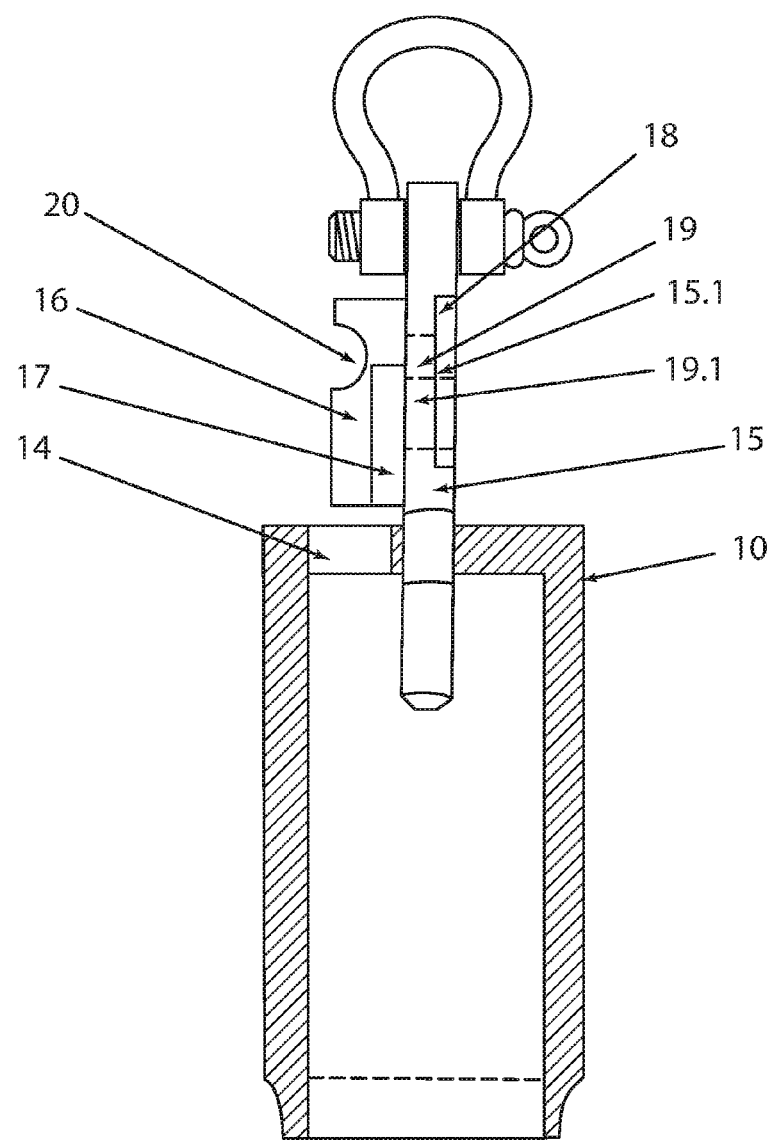
FIG. 13 is a side section view of the hoisting fitting and the body of the upper block.

The top face of the block has T-shaped hole 14, which engages with steel lifting fitting 15 shown in FIGS. 13 and 14, and as described herein.

FIG. 2 Gusset Plate 30

In one embodiment, the gusset plate 30 is cut from steel plate or other material having adequate thickness and mechanical properties for the intended function. In a further embodiment, it is ⅜" thick. The gusset plate has through holes 31, countersunk holes 32 and locating pins 33. Flathead screws 34 passed through holes 32 and threaded in to holes 13 in upper connector 10 accurately unite adjacent columns and thus whole modules. The ductility of plate 30 in the vertical plane ensures that the column groups are acting together to sustain large loads. The precision of the location of holes 32 for the flathead screws and the corresponding holes in the connectors ensures module-to-module tolerances are maintained and controlled.

The gusset plate 30 can be sized to fit on top of 1, 2, 3, 4 or more columns providing equivalent vertical separation in all locations and forming groups of 2, 3, 4 or more modules. As shown in FIG. 2.1 which discloses an embodiment of a gusset plate joining 4 modules, while FIG. 2.2 discloses a gusset plate 30 joining 2 modules. In the embodiment of the gusset plate 30 shown in FIG. 2.2, the plate is provided with a projecting edge for support of an adjacent component, as disclosed further herein.

Figure 3:
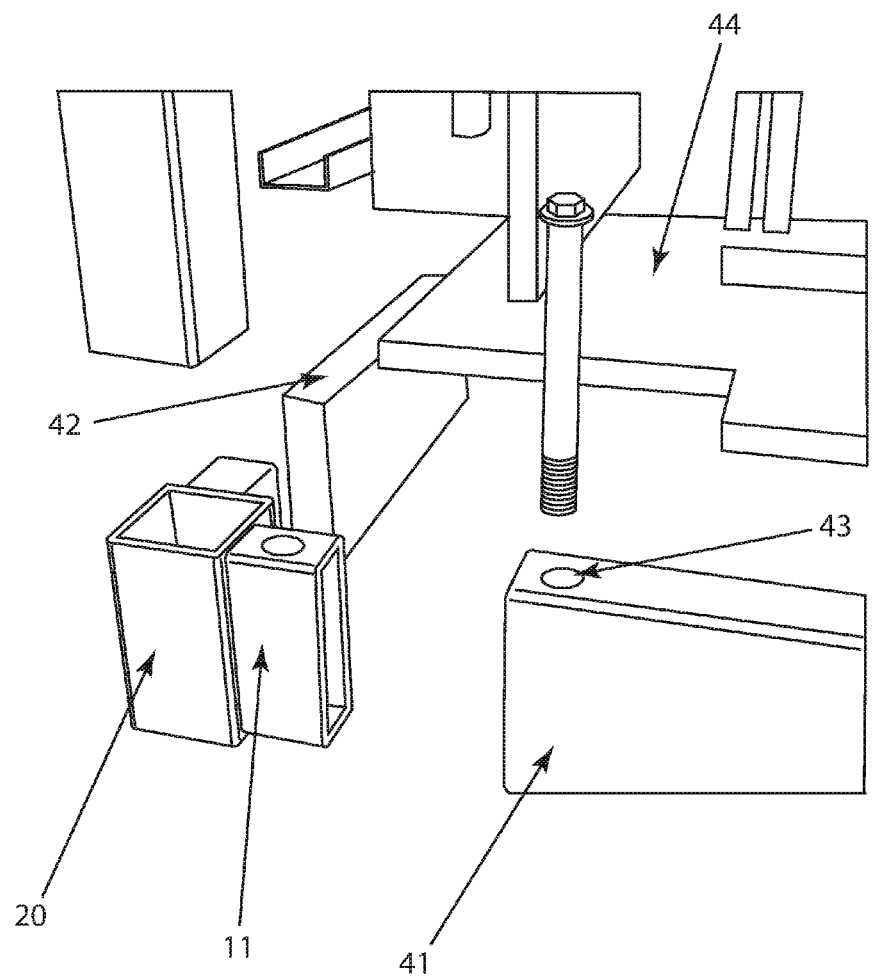
FIG. 3 is a partial exploded perspective view of a module corner.

FIG. 3 Assembly of a Module

To create the floor frame of a module, longitudinal floor beam 41 and lateral floor beam 42 are cut to length and provided with holes 43 which generally correspond with but do not interfere with the locations of the holes in arms 11 on the connector 10. In a particular embodiment, these beams are 3"×8" HSS for the perimeter and 3"×6" HSS for the infill members. Because the locating and welding fixture (FIG. 12), described herein, positions the pre-machined connecting blocks and defines the hole locations and their locations relative to each other, provides the exterior dimensions of the assembly, the fixture ensures that modules made using the fixture conform to the established grid previously described. In addition, the features on the blocks ensure that the beams do not require beveling on the edges of the ends and the cutting to length operation is not critical in either length or squareness. The beams are slipped over the corresponding arms 11 on the lower corner connector 20 and welded in the manner previously described.

A person skilled in the art should recognize that the assembly of the ceiling follows a similar process using members of an appropriate size placed in the same fixture. In a particular embodiment, these are 3"×3" HSS for the perimeter with 2"×2" HSS for the infill members. Thus both top and bottom frames capture the outer dimensions of the same fixture and are coordinated.

A suitable material 44 such as fibre-cement board, or steel sheet deck and concrete toping, or steel-composite sheet decking is applied to the top face of the floor beams of the module floor thus built, and fastened appropriately, or concrete or other material is filled between the framing so as to support occupant loads and provide the necessary diaphragm action to the module and in turn to a building composed of modules. Similarly, material such as drywall or fire-proof board and insulation of a variety of types depending on conditions is applied to the surfaces of the framing and boards and in voids in walls and ceilings to provide a variety of functions such as privacy to the occupants, to provide fireproofing to the structure and to limit the transmission of sound.

FIG. 3.1, 3.3, 3.4, 3.5 Vertical Connection of Modules to Form a Moment-Resistant Structure As previously described, lower connector tube 41 has an oversize holes 43 which communicates with the hole in arms 22 through which pass tension bolts 25 which thread in to the threaded hole in the top face of arm 11 on upper block 10 inside upper wall framing tube 45, trapping and clamping gusset plate 30 and transferring vertical tension loads through the connection.

As tension bolts 25 are threaded to the correct torque value in to the female threads in hole 12 of the of arm 11 on upper connector 20 of the module below, the tension created pulls the upper and lower frame tubes and the gusset plate together so as to establish the continuous moment action (25.1) which passes from column to column through the connection thus formed and is prevented from rotating in the vertical plane by the adjacent frame tubes, especially the deeper members which comprise the floor frame. The racking action which is a feature of all buildings subjected to wind, earthquake and other loads is thus reduced. In a particular embodiment, bolts 25 are composed of high-strength steel such as Grade 8 such that the combination of the tensile strength and the number of bolts is sufficient to resist the wind or seismic-induced uplift on the structure thus connected.

FIG. 4 Exploded View of Typical Frame

Floor frame 40 is connected to ceiling frame 47 by corner columns 50 and intermediate columns 51 which in a particular embodiment are substantially perpendicular to the floor and ceiling frames and welded in place. In another embodiment the connections between the upper and lower horizontal members and the intermediate vertical columns 48 is constructed with an intermediate connector 49 similar in form to the connectors described in FIGS. 1.1 and 1.3. but having opposed arms. In another embodiment the columns are of various lengths and mitered to fit against each other or against the blocks such that a plurality of angular relationships between the ceiling and floor is realized.

FIG. 4.1 View of Sidewall Bracing

If the loads acting on the module are sufficiently large to warrant the addition of diagonal reinforcement, the rigidifying and diagonal bracing system shown in FIG. 4.1 is installed. The diagonal reinforcing system consists of vertical reinforcing bars 60, which in a particular embodiment are of the form and installed in the location shown in FIG. 4.1 or of the forms and locations of other particular embodiments as shown in FIG. 4.2a or 4.2b. Diagonal bars 61 are welded or bolted to these members or in the case of lighter structures having smaller loads they are welded directly to the vertical or horizontal frame members or both. The module thus formed when connected to other modules by the moment-resistant corner connection creates a moment and tension resistant structure which transmits the loads throughout itself in all axes. In a particular embodiment, the bars are diagonally opposed, ¾" in section and function in tension. In another they are diagonally opposed, of 1"×3" in section and function in tension. In another they are single, of 3"×4" HSS or other dimension and function in both tension and compression as suited to the loads they are to resist.

FIGS. 4.2a and 4.2b Vertical Stiffeners

FIGS. 4.2a and 4.2b are sequentially arranged figures showing progressive means of reinforcing columns against buckling and uplift starting with the weakest at the top and ending with the strongest at the bottom.

As shown in FIG. 4.2a and FIG. 4.2b vertical stiffening and increasing of the cross section of the columns so as to increase load-bearing capacity and resistance to buckling and bending without increasing the thickness of the wall or introducing a separate brace frame is achieved by any of the means shown and applied in a progressive manner as warranted by loads and cost: Increasing wall thickness, filling the columns with grout, adding fins to the corners, grouping sections, using larger sections and grouping those sections. The particular embodiment is the approach which adds least to the thickness of the walls, especially where columns are grouped or are located in the centres of walls or where useful space would be obstructed.

Figure 5:
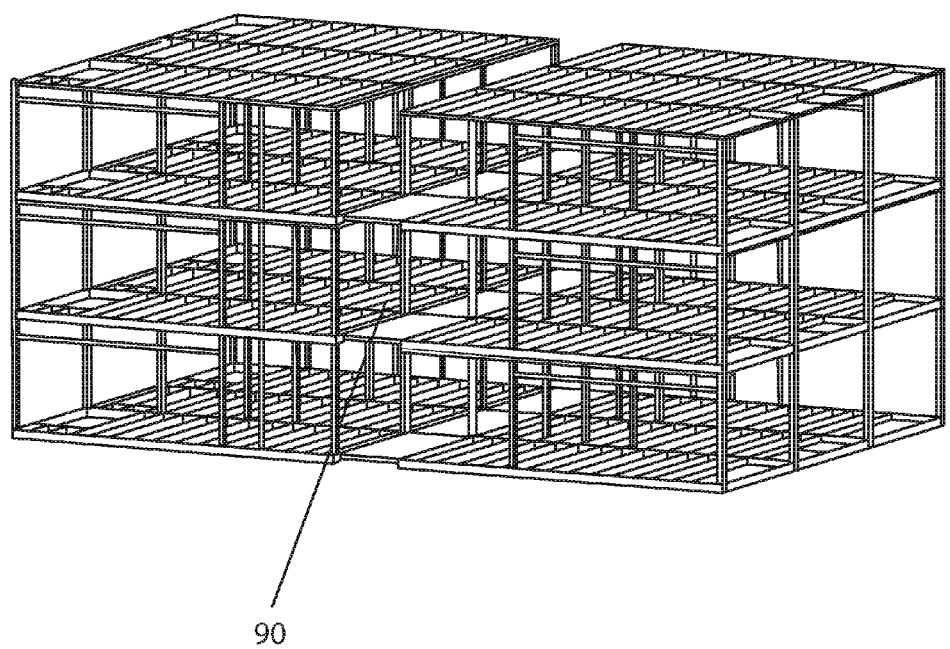
FIG. 5 is is an isometric view of a group of 18 modules joined to form a building with central hallways on all floors.

FIG. 5 View of a Small Building

Modules fabricated as described in FIG. 3 are typically connected to form larger structures as shown. In a particular embodiment, a central hallway 90 is present and can provide access to the module ends for fastening, for completing the interconnection of mechanical services and for the use of the occupants in accessing their units.

Figure 6:
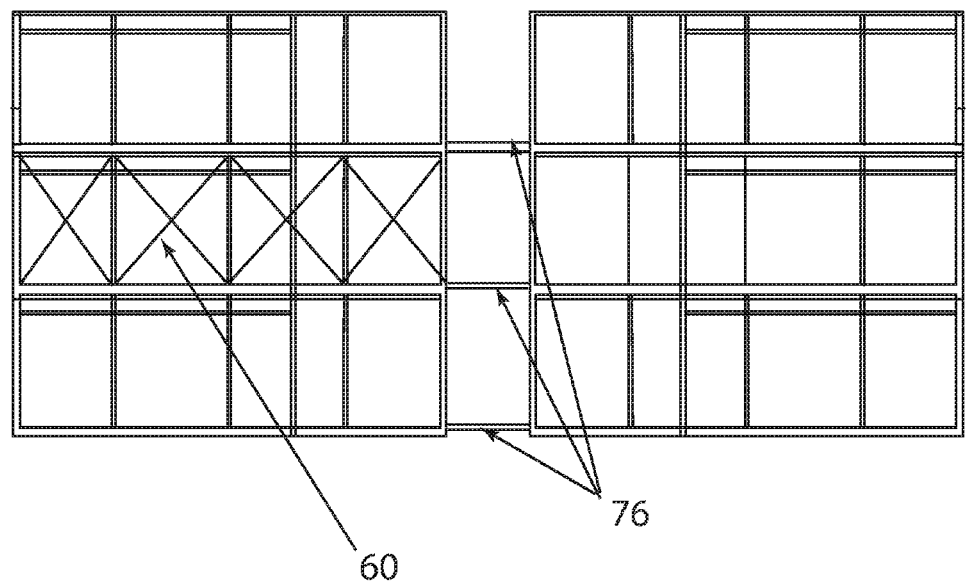
FIG. 6 is a side view of a group of modules joined to form a building.

FIG. 6 Side View of a Small Building

A side view of a typical structure with a centrally-located hallway 76 is shown, together with the diagonal bracing 60 described in FIG. 4.1.

FIG. 6.1 Front View of a Small Building

A front view of a typical structure is shown.

FIG. 7 View of Hallway Floor System

A section of floor is shown consisting of concrete slab 70, with reinforcing bars 71 and supported by pedestals 72 which are prevented from rotating by being bolted to connector blocks 10 and 20 by means of holes 74 creating a moment connection; and prevented from pulling out of the concrete by shear studs 73 which engage the concrete and the reinforcing bars. In a particular embodiment, the pedestals span vertically over upper and lower corner connectors and are bolted to them adding to the fixity of the vertical connection between columns. In another particular embodiment the slab is long enough that the pedestals span over two or more adjacent modules, adding to the fixity of the horizontal diaphragm action.

In another particular embodiment, the hallway slab is composed of formed plate, or any other suitable material such as wood or steel-urethane sandwich plate or composites.

In a particular embodiment the hallway is used as a convenient support and carrier for common services such as electrical or liquid supply lines 75 which are typically found in buildings and thus provides a means to pre-fabricate these elements, transport them to the building site and hoist them in to place without additional handling.

In an embodiment shown in FIG. 7, the pedestal 72 are in contact and positioned on the gusset plate 30. The gusset plate 30 used extends beyond the module frame to provide a surface for placing the pedestals 72 for supporting the slab.

FIG. 8 Exploded Isometric View of Connections to Hallway Floor System

When installed as described for use as the floor of a hallway between two stacks of modules separated by a suitable space, the structure thus formed unites the adjacent stacks with a moment resistant connection, such that the hallway floor structure increases the resistance of the entire building to lateral loads, thereby reducing both the number and size of diagonal reinforcement required.

In another particular embodiment the hallway slab structure is connected to the outer face of a stack of modules and supported by a column grid or diagonal tension braces or diagonal struts to provide a breezeway or balcony. In the embodiment shown in FIG. 8, the pedestals 72 of the hallway 70 are each provided with a pair of holes 74. The first set of holes 74 in the pedestal that are positioned closer to the floor 70 can be coupled to the lower connector 20 in the upper modular frame. While the second set of holes 74 in the pedestal that are positioned away from the floor 70 can be coupled to the upper connector 10 in a lower modular frame. Consequently, in the embodiment shown in FIG. 8, the pedestals are not positioned on the gusset plate 30, which lack the extension shown in FIG. 7.

Figure 9:
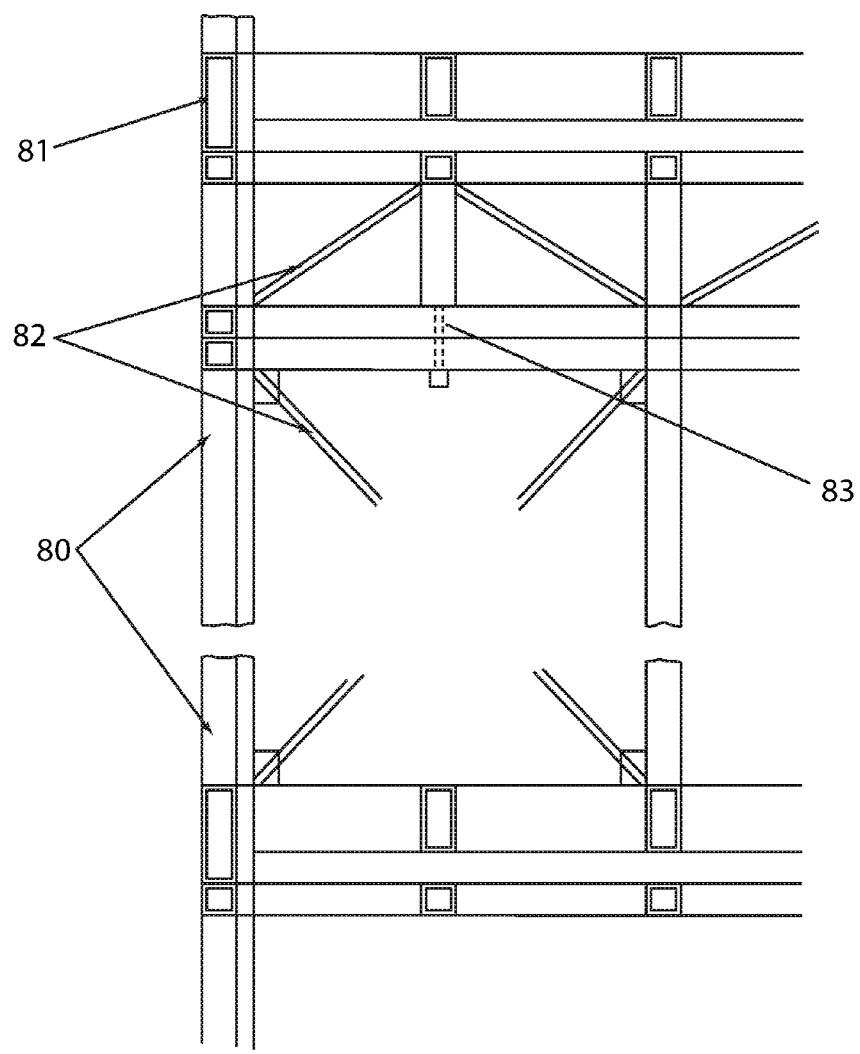
FIG. 9 is a side section view through an extra tall module composed of two joined modules.

FIG. 9 Double Height Modules

When it is desirable to create spaces which are taller than one piece shipment by road will allow modules are joined using bolts through the horizontal frame members. FIG. 9 shows an open-topped module 80 joined to an open-bottomed module 81 using bolts 83. Diagonal bracing 82 is configured to provide the continuous diagonal bracing action required.

Figure 10:
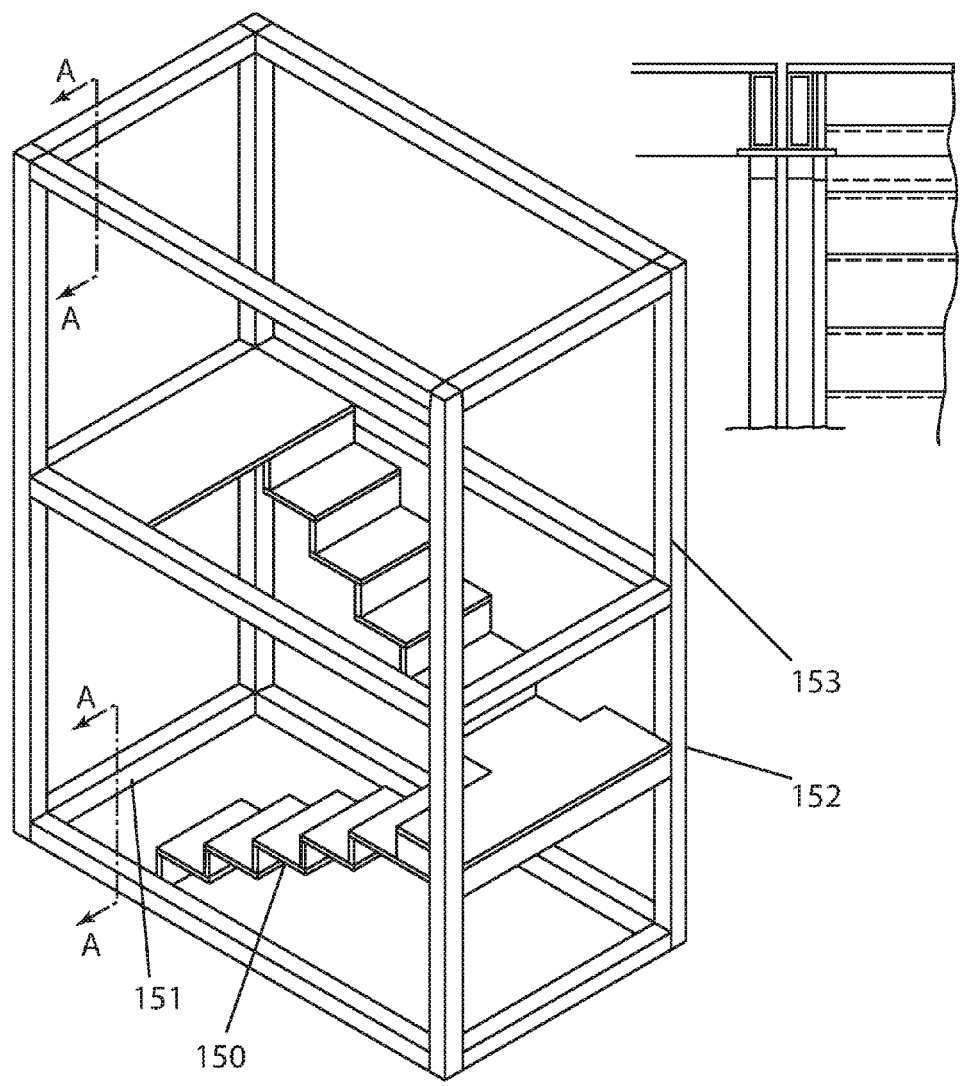
FIG. 10 is an isometric view of two stacked stair tower modules with a front view of the mateline in adjacent columns.

FIG. 10 Stair Tower Showing Mateline

Stairs and stair stringers 150 and doors 151 are shown factory installed in consecutive module frames 152 and 153 which are prepared for connection on site with the system of gusset plates and corner connectors previously described.

Figure 11:
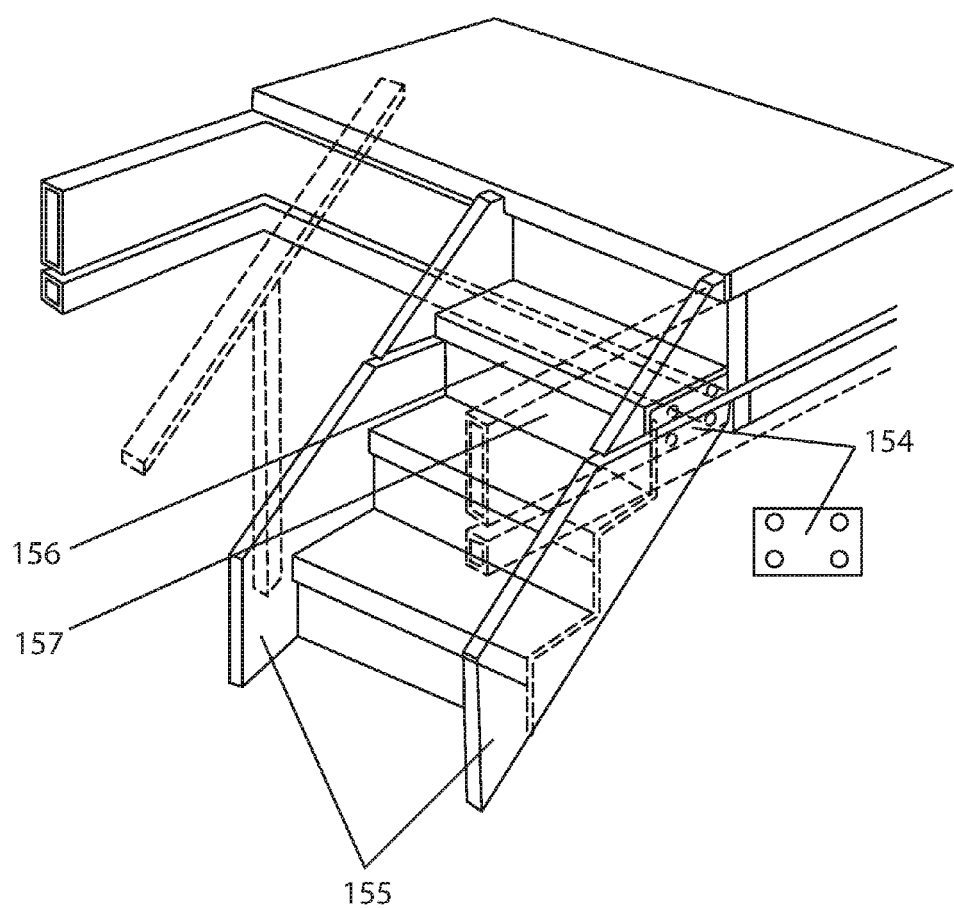
FIG. 11 is a partial perspective view of the blind connection of the stair at the mateline.

FIG. 11 Invisible Splice in Stair Stringers

The riser is split horizontally on the same plane as the module within which it is installed. So as to minimize the visual impact of the horizontal mateline between modules, the stairs are joined by hidden plates 154 on the inside faces of the stringers 155 under and behind the treads 156 and risers 157.

FIG. 12 Floor, Ceiling and Wall Assembly Fixture

Floors, ceilings, infill walls and other structures as required are built in fixture 100 so as to ensure vertical alignment and regularity of features. The use of the fixture ensures that modules conform to the established grid previously described.

FIG. 12.1, Fixture, Jig Pins and Jig Pin Locations

To position the members of a module floor for welding, perimeter beams 40 and 41 are passed over the arms of connector 20 as the assembly is placed in fixture 100 which locates the block in locator 105 in contact with buttons 102 which contact the centres of the two outer vertical faces and lower face of the connector and thus maintains perpendicularity of the connector and can help to establish the outside dimensions of the module so as to prevent accumulation of error, or maintain any other geometric relationship as may be desirable. The outer face of the perimeter beams are located by means of contact with the sides of pins 101 which are not stepped and the inside faces are located by contact with stepped pins 101.1 which are stepped so as to allow for the small variations which occur in the production of sections and ensure that no part of the assembly exceeds the tolerance envelope. The intermediate floor beams 42 are placed in accordance with the pre-defined grid established by contact with stepped pins 101.1 which can in this instance be used on both sides of the member so located.

A floor assembly is complete by welding the perimeter beams and intermediate beams to the corner connectors and to each other.

FIG. 12.2 Elevating Blocks

If it is not convenient to assemble the frame in an inverted position, or if steps in the floor height are required, the members are elevated using variable-height spacers 103 sized and selected as required to orient the top faces correctly. In another embodiment the spacers are cut from HSS in the form shown in 104 and placed loosely over the pins.

FIG. 12.3 Jig Clearances

The beams are welded in place exploiting the clearances provided by the position of the pins, positioned horizontally by the sides of the pins and elevated by the spacers.

FIGS. 13 and 14 Hoistable Connector Assembly

FIG. 13 discloses an embodiment of a hoistable connector assembly that can be used for connection and hoisting of a modular frame that has an upper connector 10, as described herein.

As previously described, the top face of the upper corner connector 10 can have a T-shaped hole (or opening) 14, which engages with a "T"-shaped engaging means on the body 15 of the lifting device. In the embodiment shown, the body of the lifting device has a T-shaped end that can be inserted into the T-shaped opening in the connector 10. In a further embodiment, as shown in the figures, the lifting device is provided with a block 16, which is coupled to the body of the lifting device. The block 16 can move from a first disengaged position to a second engaged position. The first disengaged position (as shown in FIG. 13) allows the T-shaped end to be inserted or removed from the T-shaped opening in the connector 10. While in the second engaged position, the block 16 slides into the T-shaped opening (see arrow in FIG. 13 that shows the sliding direction of the block 16), and prevents removal of the T-shaped end from the connector 10 and locking the connection in place.

To connect the lifting frame to the module to be lifted, block 16 is raised to clear the lifting feature on body 15 and the feature introduced in to the slot then moved sideways (see arrow present inside connector in FIG. 13). Once engaged in hole 14, the fitting is locked in place by the action of gravity which causes block 16 to slide downward between guides 17 so as to occupy the wider entry portion of the slot, thus preventing backward movement and accidental releases of the lifting fitting. Block 16 is held to the face of the body 15 by a retainer 15.1 running freely in recess 18 which is fastened to stand off 19 which moves vertically in slot 19.1. The relatively delicate features of the block retainer are thus flush with the surface so as to prevent damage by inadvertent contact during handling. So as to prevent fouling by the rising chain or cable, block 16 is manipulated using a finger inserted in depression 20 in the surface of block. In another particular embodiment the block is pressed in to the entry slot independently of the effect of gravity by a supplementary spring interposed between the top surface of the standoff 18 and the underside of the slot 19. In another embodiment a sensor is positioned so as to detect the proper position of the locking block in the lifting slot. A signal thus generated is transmitted to the controls of the equipment or to the operator so as to prevent lifting of the load if the lifting device is not fully and properly engaged.

As shown in FIG. 14, the distal end (distal from the T-shaped end) can be provided with a hole, which can be used for coupling and lifting the hoistable connector assembly.

FIGS. 15 and 17.1 Liftable Frame Assembly

A lifting frame is provided for the reduction of the compression loads on the module frame members attributable to the pyramidal displacement of the lifting lines, and to provide a means to accurately level the modules during all phases of the lift and irrespective of the length of line passing upward to the crane, so as to facilitate placement of the modules without inadvertent contact which can damage frames, seals, insulation and finishes.

Beams 80 are joined by struts 81 through flanges 82 using bolts. Eight sliding hoist points 83 are provided which slide on beams 80 and are prevented from moving when locked in place using locking pins 84 in rows of holes 85. Load-bearing cables 86 pass upwards and converge on master hoisting fitting 87 shown in FIG. 17.

In the embodiment shown in FIG. 15, the beam 80 can be an I-beam that has an upper end and a lower end. A first set of four hoist blocks 83 are provided on the upper end of the beam 80 and a second set of hoist blocks 83 are provided on the lower end of the beam 80. The hoist blocks 83 are coupled to the beam and can move (for instance by sliding the hoist block) from a first position to a second position, as may be required for lifting a frame. The I-beam can also be provided with a plurality of holes near the first and second ends, which allows affixing of the hoist blocks 83 in place on the I-beam by use of fasteners, such as bolts and nuts.

The first set of hoist blocks 83 present on the upper end (or first end) of the I-beam are attached to load bearing cables 86, which are attached to a master hoisting fitting 87 shown in FIG. 17. The lifting frame structure be balanced to reduce load on any particular portion of the modular frame by moving the hoist blocks 83 on the I-beam 80, and fastening the hoist blocks 83 in a different position.

FIG. 16 Hoisting Rigging

FIG. 16 shows a side view of a portion of the liftable frame assembly of FIG. 15. The hoistable connector assembly 15 is connected by shackle 88 to chain or wire rope 89 which is connected by another shackle to the lower portion of a typical sliding hoist point 83 located on the lower end of a lifting frame 80. Locking pin or pins 84 prevent movement of the sliding blocks.

FIG. 17 Hoisting Geometry

In preparation for hoisting a module, the centre of gravity of the module is determined by the use of a computer program capable of calculating the centre of gravity based on the recorded weights and positions of the masses which comprise the module as represented in a computer model, or iteratively by one or more trial lifts. The data thus gathered is recorded and provided with the module. A table is prepared using a computer program or trigonometry which specifies the hole locations to be used to adjust the combined centre of gravity of the module and hoisting frame system to level the module to be hoisted. Prior to connecting the hoisting frame to the module, the table is consulted and the sliding blocks are located and locked in place in the stated positions.

To move the centre of gravity of the system along the long axis of the system, hoist points 83 are moved as a group towards the centre of gravity of the load, maintaining an equidistant (quadrilateral) arrangement. To move the centre of gravity sideways, 88, at right angles to the long axis of the system, the hoist points 83 on one side only of the beams 80 are brought together or spread apart so as to increase or decrease the angle between them thus changing the angular relationship between the hoisting lines passing upwards to common hoisting point 87.

In another embodiment the hoist points are moved independently to achieve other desirable objectives, such as equalizing the load on the slings or to tilt the load intentionally.

In another embodiment the frame is composed of a single beam, in another embodiment the frame is not quadrilateral but triangular, polygonal or any other shape as may be convenient for the purpose of best supporting and balancing the load.

FIG. 15.1 View of a Single Sliding Block with Fabrication Details

FIG. 15.1 discloses an embodiment of a hoist block in accordance with the invention. The hoist block can be made of a block having a T-shaped channel extending from one face to another face of the block, and having an opening on an upper end of the block. The opening on the upper end extends to the T-shaped opening in the block. The block also has a first flange extending upwardly from the upper face of the block and a second flange extending from the lower end of the block. Each flange is provided with an opening for coupling the block. In a particular embodiment, the block is machined from solid steel or cast or fabricated from another suitable material. In another particular embodiment, the block is welded from plate as shown.

Figure 18:
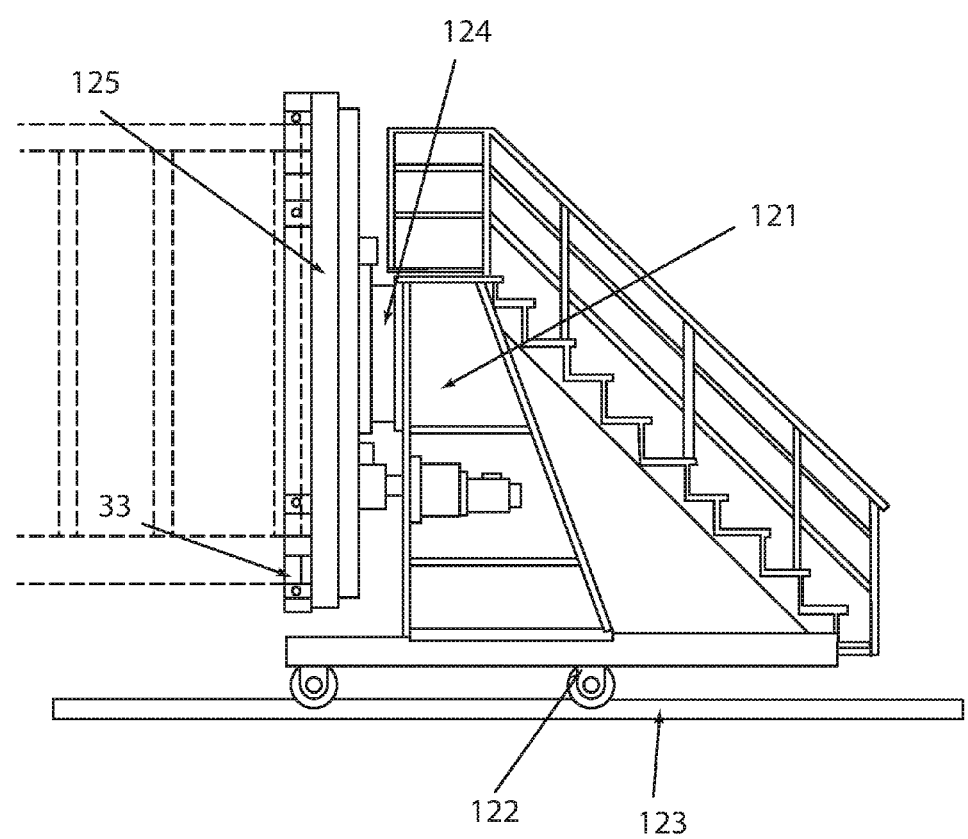
FIG. 18 is a side view of one of a pair of the rotating module assembly fixtures required to assemble a module.

FIG. 18 Module Assembly Fixture

To assemble a complete module frame, the completed floor is placed in the stops on the platens of two opposed and mirror imaged powered rotatable fixture 120 (FIG. 18, 19, 20). Tower 121 moves on rollers 122 which are equipped with flanges so as to locate accurately and squarely on track 122.1. A pin through a bracket on the base of tower 121 engages a row of holes adjacent to track 122.1 so as to ensure consistency with the defined dimensional grid previously described. Slewing bearing 124 supports platen 125 and allows the platen to rotate so as to position the work in the ideal posture for assembly and welding. An identical structure is located on the same track and opposes the structure shown and supports the opposite end of the frame.

Figure 19:
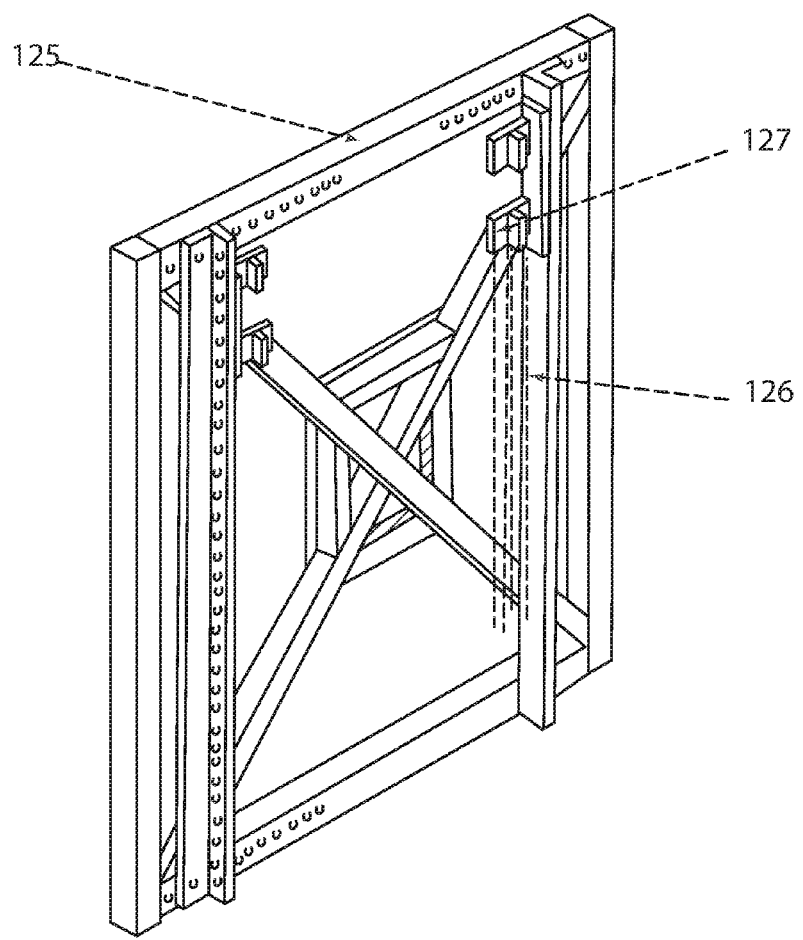
FIG. 19 is an isometric view of the platen of the device in FIG. 18.
Figure 20:
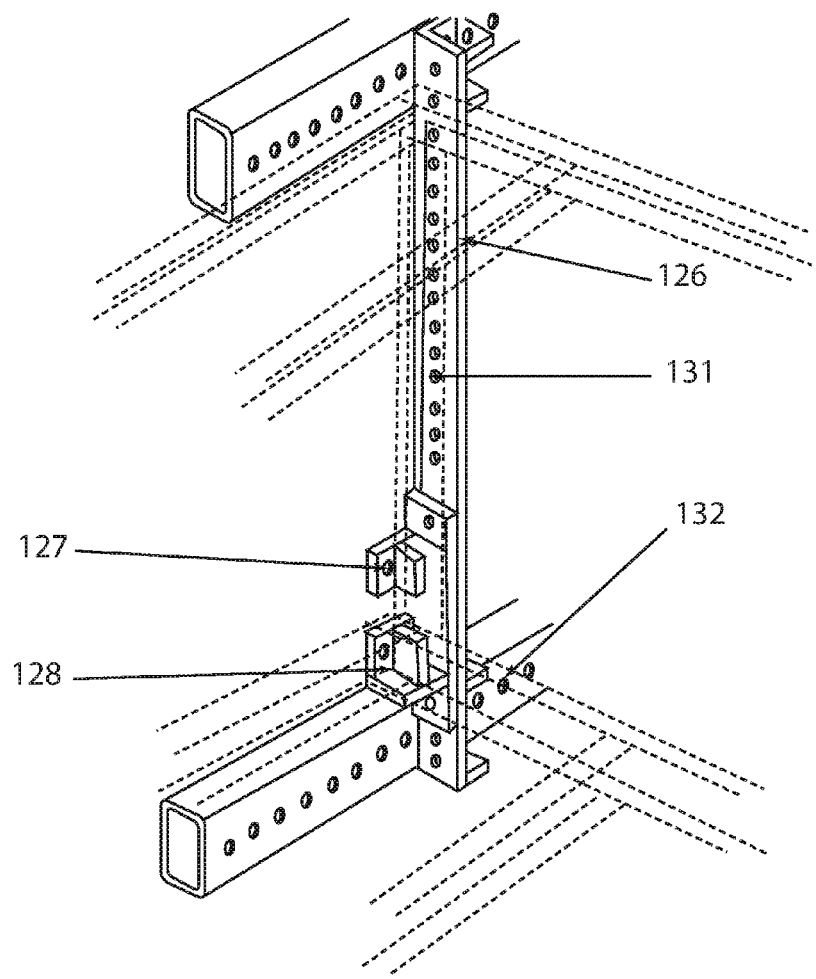
FIG. 20 is a partial isometric view of the locating stop rack which is part of FIG. 19.

FIG. 19 Platen and FIG. 20 Movable Stop Racks

Platen 125 has two or more movable stop racks 126 mounted to its vertical face, to which are mounted side work supports 127 and top/bottom work supports 128 (FIG. 20) which locate to the outer and lower and outer and upper faces of the corresponding corner connectors in the same orientation as the fixture in which it was built. The holes in the work supports match the holes in the corresponding connectors thus ensuring that modules built in the fixture will interconnnect with the corresponding components built in this and other fixtures.

Column 50 is slipped over the locating projections on lower corner connector 20 if present or oriented proximally if not, and restrained by clamps 121 (not shown) which act against column support bars 122. Then corner connectors 10 located at the corners of the upper frame assembly are placed upon the top end of the columns and located by the upper and outer faces of the corner blocks, then the intermediate vertical tubes 51 are placed in the intermediate clamp-on receivers (not shown) and restrained with additional clamps 130 (not shown). The locating projections on the interior outer faces of the column support bars combined with the clamps prevent the frame components from moving during assembly welding which proceeds in an ideal position as facilitated by the rotation of the fixture.

The fixture is equipped with a plurality of frame width defining holes 131 and frame height defining holes 132 so as to facilitate accurate and rapid adjustment of the jig for the production of modules of varying shapes and in logical increments and which ensure that the parts thus constructed coordinate with other components constructed in accordance with the scheme of the present invention.

Figure 21:
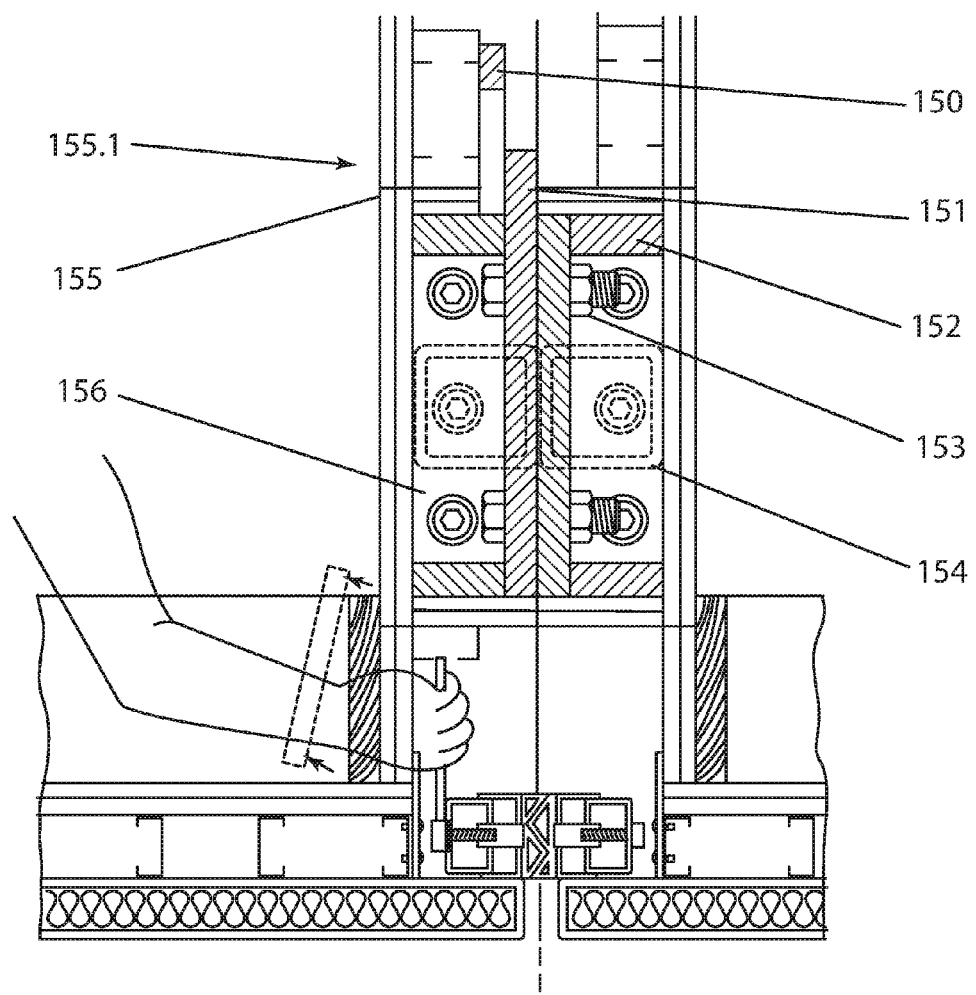
FIG. 21 is a section view through a split column.

FIG. 21 is a Section View Through a Split Column

FIG. 21 discloses a particular embodiment of a shared structural column. A built-up "C" section 152 spanning the height of the module is bolted in multiple locations with bolts 153 to a similar section 151 forming a column which is twice as wide thus providing greater resistance to buckling forces. Baseplate 156 which occurs at both the top and bottom forms a transition to lighter columns 154 or heavier columns as appropriate depending on the loads. Diagonal braces 150 as required are connected to the extended web of column 151. A removeable section of fire-proof wall board 155 is provided for access to the bolts during erection of the structure.

Figure 22:
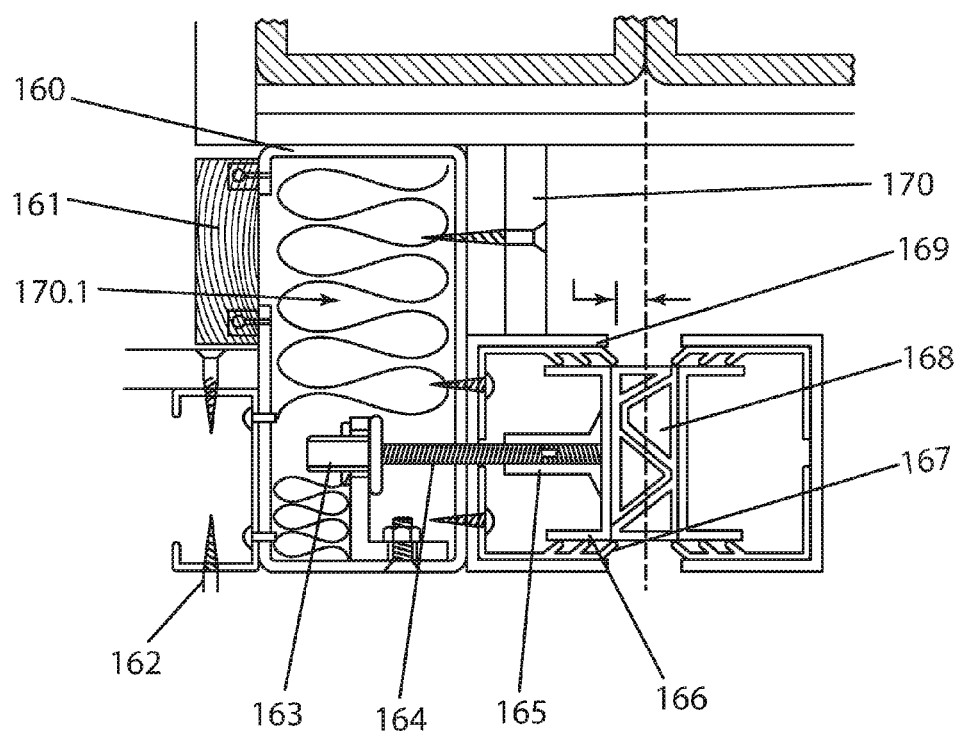
FIG. 22 is a section through an extendable mateline gasket.

FIG. 22 is a Section Through an Extendable Mateline Gasket

A particular embodiment of an extendable mateline gasket is shown. Molded or extruded elastic material 168 with multiple sealing features is fastened to channel 166, which slides in gasket 167 which is fastened to the inner surface of channel 169 and is extended by captive screw 164 travelling in threaded socket 165 and actuated by rotating head 163. The assembly is mounted to support channel 160 which can be of any convenient depth to which is fastened acoustic and fire-resistant material 170. Access to operate the gasket advancing screw is through cover 161 which can, in a particular embodiment, be decorative and fastened in a removable manner.

To form a seal between a first modular unit with a second modular unit, the modular units are each provided with a channel 166. In the embodiment shown, a gasket 167 is present in the channel 160, along with a toothed connector 168. The toothed connector has a profile that is complementary to the toothed profile in the channel in the second modular unit. In a particular embodiment, the gasket 167 allows movement of the toothed connector 168 in one direction only, which is away from the modular frame. This can be achieved by, for instance, providing angled tabs that extend from a surface of the toothed connector and corresponding receptacles in the gasket 167 for receiving the tabs. Once the tabs are inserted into the receptacles, the gasket is locked in place and can prevent the toothed connector from moving back into the channel 160.

Initially, the two modular units are brought in contact with each other and the channels aligned. The toothed connector in the second modular frame can be present in an extended position, where it extends beyond the mateline of the two modular frames and also beyond the cavity of the channel 160. Once in place, the toothed connector in the first channel can be extended from a disengaged position, where the toothed connector is positioned within the cavity of the channel to an engaged position, where it extends outside the cavity of the channel and the teeth of the toothed connector in the first modular frame engage and align with the complementary teeth of the toothed connector in the second modular frame.

Figure 23:
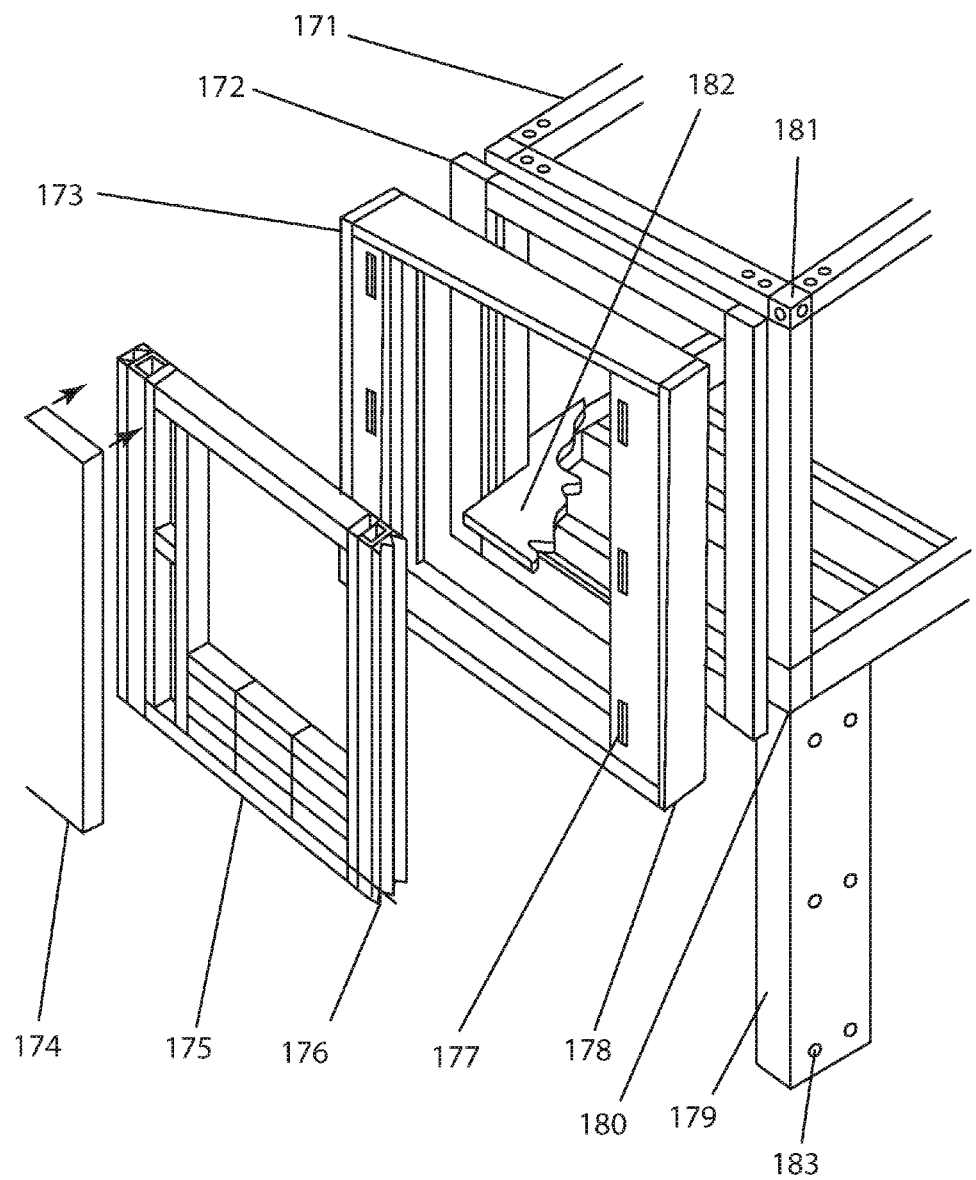
FIG. 23 is an exploded view of the façade system.

FIG. 23 is an Exploded View of the Façade System

A particular embodiment of a façade system for modular construction is shown together with the associated structural frame. The structural frame 171 with moment blocks 181 is fireproofed with insulating board layer 172 and decked with flooring board 182 and is shown supported by one half of progressively reinforced split column 179 connected to the adjacent column (not shown) using bolts inserted in holes 183. Spacer frame 173 is acoustically and fire insulated with board layer 178 and is provided with holes 177 to access gasket extension screws 164 (FIG. 22). Façade infill and gasket mounting frame 175 is equipped with gasket assembly 176 and faced with exterior wall panel 174. The transition to a built up structural column 179 with slip-critical bolting 183 is shown.

Figure 24:
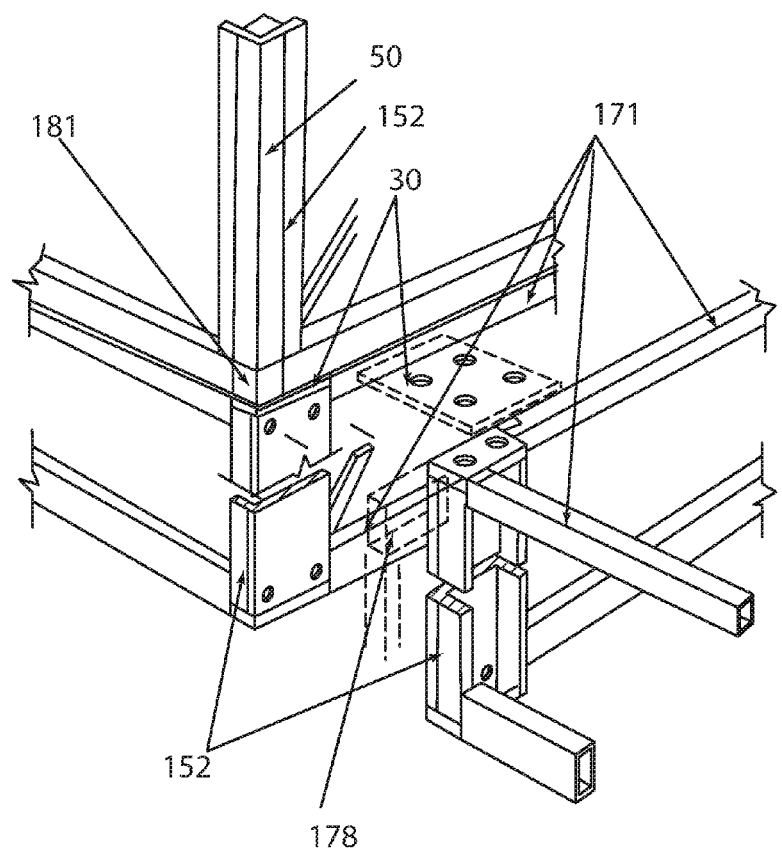
FIG. 24 is a partially exploded view of the connection between an upper floor module built with reinforced columns and a lower floor module built with built-up mega columns.

FIG. 24 is an Exploded View of the Vertical Transition at a Shared Structural Column A particular embodiment of both halves of a shared structural column at the point of transition to a lighter column is shown. Built up "C" sections 152 are bolted to one another to form an "I" section. The members of structural frame 171 are welded to the "C" channels in lieu of the moment blocks in the frames where the "C" sections are used. Moment block 181 rests on combined shiming and gusset plate 30 (greater detail can be found in FIG. 2) which is in turn fastened to the top end of columns 152. Façade framing 173 is fastened to the face of the assembly in a manner similar to FIG. 23

Figure 25:
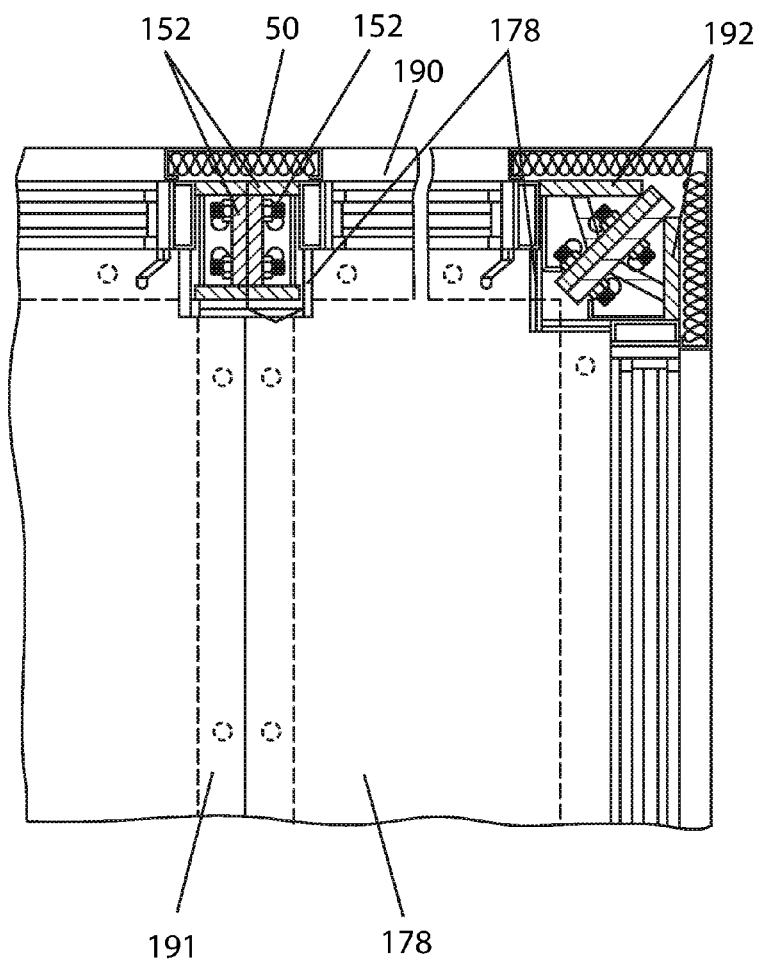
FIG. 25 is a horizontal section of a panelized structure constructed with panels framed by built-up mega columns.

FIG. 25 is a Horizontal Section of a Structural Panelized Façade System

A particular embodiment of a structural façade system for a modular building is shown. Built up sections 152 are joined in the manner previously described by headers top and bottom to form assemblies with window units 190, but unlike the volumetric modules previously described, the façade units are shipped and erected separate from the floors and interior walls. Beams 191 support floor slabs 178. Fireproof covering 178 insulates the steel structure. Façade panel 50 provides insulation and appearance. As someone skilled in the art will appreciate, 45 degree split corner column 192 performs a similar function at a 90 degree outside corner. In another particular embodiment the angle of the split corner column is greater than or less than 45 degrees so as to facilitate the construction of structures with variable geometry.

Figure 26:
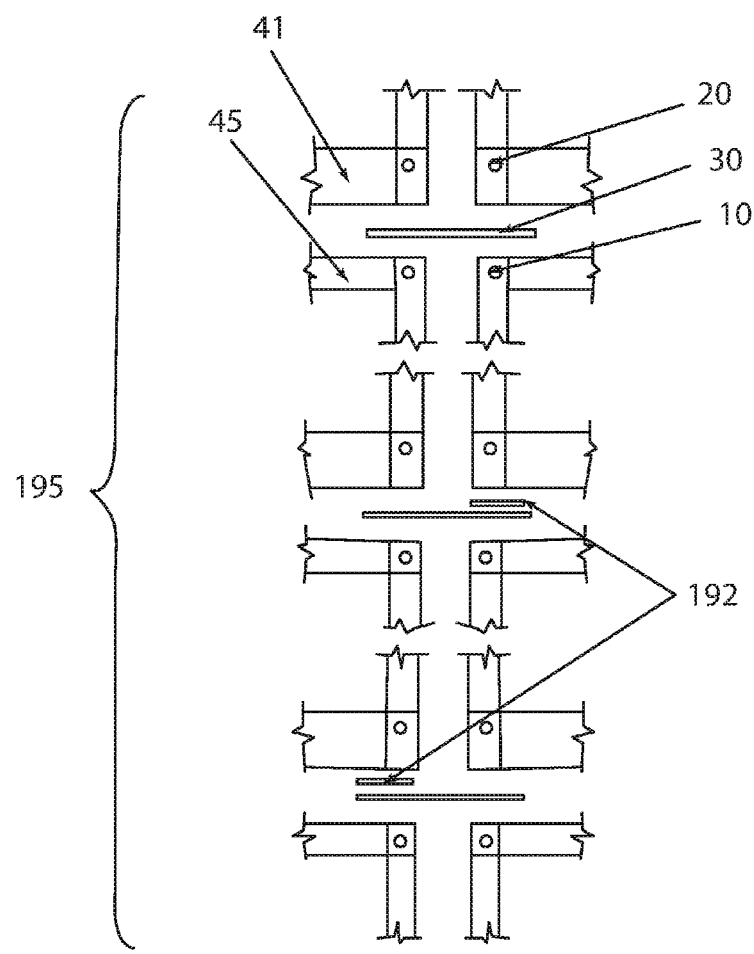
FIG. 26 is an exploded vertical view of a stack of modules showing the use of gusset plates of varying thickness and number to maintain the correct total height and alignment of a stack of modules.

FIG. 26 is a Simplified Exploded View of a Vertical Stack of Modules

As previously described, upper corner connector 10 is joined to lower corner connector 20 by bolts passing through gusset plate 30. In a particular embodiment, gusset plate 30 is provided in a variety of thicknesses which can be selected during assembly of the building and interposed in the connection as required to compensate for variations in the dimensions of the modules, such that the total dimension of the stack of modules conforms to the correct value as measured at 195. In another particular embodiment, a partial plate 192 is provided with the corresponding hole pattern and in a variety of thicknesses to compensate for differences in the dimensions of adjacent modules.

Figure 27:
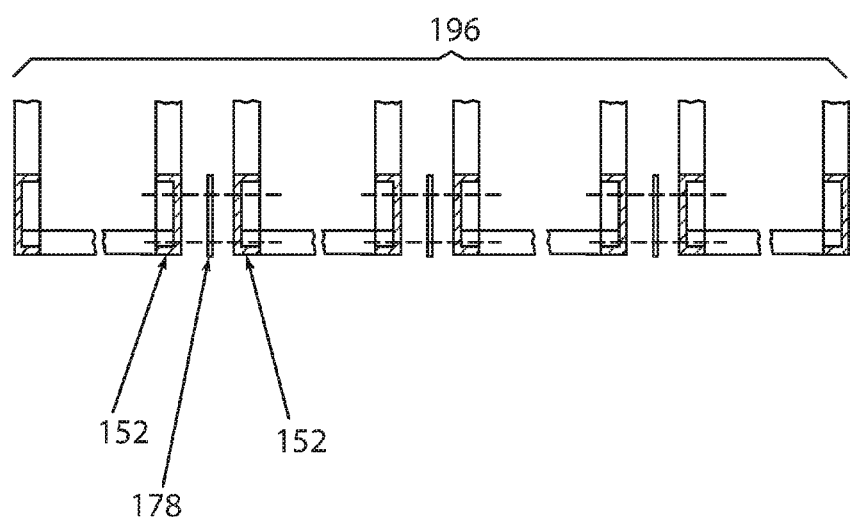
FIG. 27 is an exploded horizontal section of a row of modules showing the use of shims of varying thickness and number to maintain the correct total width and alignment of a row of modules.

FIG. 27 is a Simplified Exploded View of a Horizontal Row of Modules

As previously described, built up "C" section columns composed of two halves 152 are bolted together to join adjacent modules and to form a larger section. In a particular embodiment, shim 178 is provided in a variety of thicknesses and with pre-cut holes for the passage of connecting bolts. During assembly of the building the appropriate shim can be selected and interposed in the connection as required to compensate for variations in the accumulated horizontal dimension of the modules as measured at 196.

Certain adaptations and modifications of the described embodiments can be made. Therefore, the above discussed embodiments are considered to be illustrative and not restrictive.

What is claimed is:

1. A connector assembly, comprising an upper connector coupled to a lower connector and a gusset plate sandwiched between the upper and lower connectors,
    the lower connector comprising:
        a lower connector hollow body having lower connector first and second ends, the first end being adapted for receiving a first end of a first module frame and the second end being adapted for coupling to the gusset plate;
        at least a pair of lower connector bosses coupled to the lower connector hollow body; and
        at least a pair of lower connector arms, each lower connector arm being coupled to and extending from the lower connector boss and having an aperture for receiving a fastening means to couple the lower connector to the upper connector;
    the upper connector comprising:
        an upper connector hollow body having upper connector first and second ends, the first end being adapted for coupling to the gusset plate and the second end being adapted for receiving a first end of a second module frame;
        at least a pair of upper connector bosses coupled to the upper connector hollow body; and
        at least a pair of upper connector arms, each upper connector arm being coupled to and extending from the upper connector boss and having first and second apertures, the first aperture adapted for receiving a coupling means to couple the upper connector to the gusset plate and the second aperture adapted for receiving the fastening means to couple the lower connector to the upper connector; and
    the gusset plate comprising:
        a first face, a second face and through holes for receiving the coupling and fastening means to couple the upper and lower connectors.

2. The connector assembly according to claim 1, further comprising a locating pin positioned on the first face of the gusset plate for engaging the second end of the lower connector hollow body for positioning the second connector on the gusset plate.

3. The connector assembly according to claim 1, wherein the lower connector hollow body and/or the upper connector hollow body have one or more bores adapted for receiving affixing means.

4. The connector assembly according to claim 1, wherein the upper connector hollow body has a generally T-shaped opening at the first end of the body.

* * * * *